(12) United States Patent
Fang

(10) Patent No.: US 9,654,245 B2
(45) Date of Patent: May 16, 2017

(54) OPTIMIZING OPTICAL SYSTEMS USING CODE DIVISION MULTIPLE ACCESS AND/OR ORTHOGONAL FREQUENCY-DIVISION MULTIPLEXING

(71) Applicant: Futurewei Technologies, Inc., Plano, TX (US)

(72) Inventor: Liming Fang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/951,276

(22) Filed: Nov. 24, 2015

(65) Prior Publication Data

US 2016/0080102 A1 Mar. 17, 2016

Related U.S. Application Data

(63) Continuation of application No. 14/101,969, filed on Dec. 10, 2013, now Pat. No. 9,225,453.

(60) Provisional application No. 61/810,168, filed on Apr. 9, 2013.

(51) Int. Cl.
| | |
|---|---|
| *H04B 10/00* | (2013.01) |
| *H04J 14/00* | (2006.01) |
| *H04B 10/516* | (2013.01) |
| *H04B 10/60* | (2013.01) |
| *H04J 14/02* | (2006.01) |
| *H04J 13/00* | (2011.01) |
| *H04L 27/26* | (2006.01) |

(52) U.S. Cl.
CPC .......... *H04J 14/005* (2013.01); *H04B 10/516* (2013.01); *H04B 10/60* (2013.01); *H04J 13/00* (2013.01); *H04J 14/02* (2013.01); *H04L 27/2626* (2013.01)

(58) Field of Classification Search
USPC ................................................ 398/202–214
See application file for complete search history.

(56) References Cited

U.S. PATENT DOCUMENTS

| | | | |
|---|---|---|---|
| 7,076,168 B1* | 7/2006 | Shattil | H04B 10/25752 398/202 |
| 7,324,755 B2* | 1/2008 | Izadpanah | F16K 37/0075 398/77 |
| 7,406,261 B2* | 7/2008 | Shattil | H04L 27/00 398/182 |
| 7,555,216 B2* | 6/2009 | Yoshino | H04B 10/548 398/193 |
| 7,876,806 B2* | 1/2011 | Pan | H04L 5/026 375/130 |

(Continued)

*Primary Examiner* — Agustin Bello
(74) *Attorney, Agent, or Firm* — Futurewei Technologies, Inc.

(57) ABSTRACT

An optical receiver comprises an optical port configured to receive an encoded optical signal, and a demodulation block indirectly coupled to the port and comprising a multiplexer, wherein the multiplexer is configured to receive an encoded electrical signal, wherein the encoded electrical signal is associated with the encoded optical signal, and wherein the encoded electrical signal is encoded using a code division multiple access (CDMA) scheme, receive a code associated with the scheme, perform a dot multiplication of the encoded electrical signal and the code, and generate a differential voltage based on the dot multiplication.

18 Claims, 32 Drawing Sheets

(56) References Cited

U.S. PATENT DOCUMENTS

| | | | | |
|---|---|---|---|---|
| 8,032,034 B2* | 10/2011 | Yoshino | ............ | H04B 10/61 398/140 |
| 8,705,641 B2* | 4/2014 | Tsai | ............ | H04L 5/026 375/260 |
| 9,225,453 B2* | 12/2015 | Fang | ............ | H04J 14/005 |
| 2003/0147655 A1* | 8/2003 | Shattil | ............ | H04L 27/00 398/182 |
| 2004/0018018 A1* | 1/2004 | Izadpanah | ............ | F16K 37/0075 398/77 |
| 2006/0147219 A1* | 7/2006 | Yoshino | ............ | H04B 10/548 398/183 |
| 2009/0092392 A1* | 4/2009 | Huang | ............ | H04J 14/005 398/79 |
| 2009/0274470 A1* | 11/2009 | Yoshino | ............ | H04B 10/61 398/183 |
| 2010/0215373 A1* | 8/2010 | Iwamura | ............ | H04J 13/0003 398/98 |
| 2012/0106654 A1* | 5/2012 | Eyvazkhani | ............ | H03M 13/25 375/254 |
| 2014/0185654 A1* | 7/2014 | Zhang | ............ | H04L 5/026 375/146 |
| 2014/0301734 A1* | 10/2014 | Fang | ............ | H04J 14/005 398/76 |
| 2016/0080102 A1* | 3/2016 | Fang | ............ | H04J 14/005 398/74 |
| 2016/0204869 A1* | 7/2016 | Nishihara | ............ | H04B 10/516 398/43 |

* cited by examiner

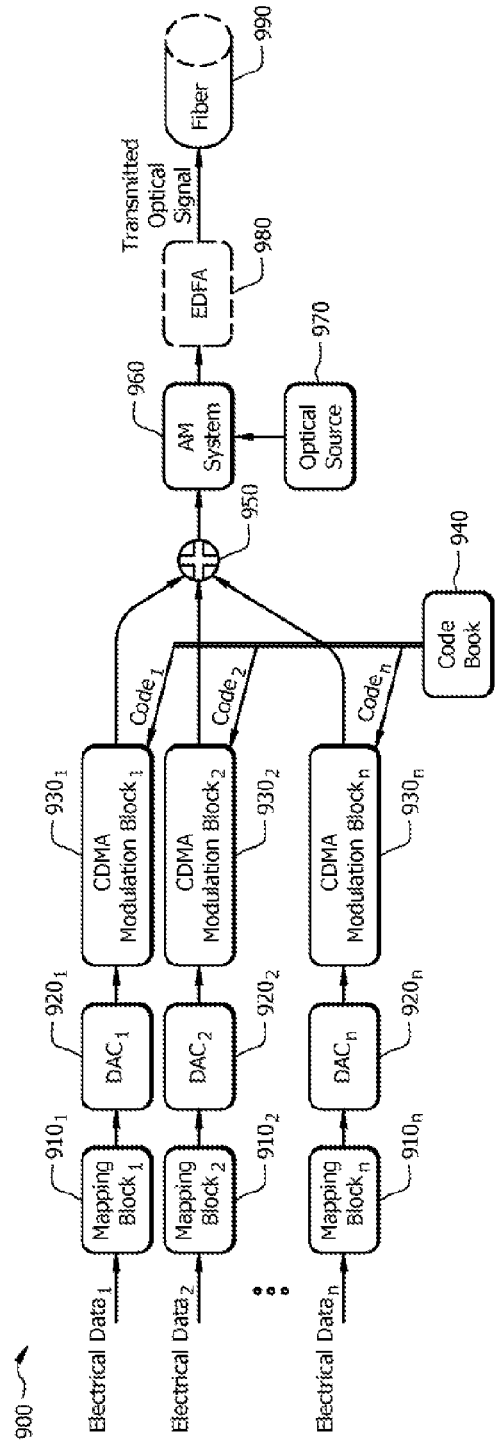

OPTIMIZING OPTICAL SYSTEMS USING CODE DIVISION MULTIPLE ACCESS AND/OR ORTHOGONAL FREQUENCY-DIVISION MULTIPLEXING

CROSS-REFERENCE TO RELATED APPLICATIONS

This application is a continuation application of U.S. Non-Provisional application Ser. No. 14/101,969 filed on Dec. 10, 2013, entitled "Optimizing Optical Systems Using Code Division Multiple Access and/or Orthogonal Frequency-Division Multiplexing," which claims benefit of U.S. Provisional Application No. 61/810,168 filed Apr. 9, 2013 by Liming Fang and titled "Method of Transmission on Fiber Based on PON and Short Distance Transportation Architecture," all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." A PON is a point-to-multipoint network comprised of an optical line terminal (OLT) at a central office (CO), a plurality of optical network units (ONUs) at the user premises, and an optical distribution network (ODN) connecting the OLT and the ONUs. PONs may also comprise remote nodes (RNs) located between the OLTs and the ONUs, for example, at the end of a road where multiple users reside. In recent years, time division multiplexing (TDM) PONs and wavelength division multiplexing (WDM) PONs have been deployed in order to increase bandwidth. In TDM PONs, each ONU may send and receive data across every available wavelength, but only at dedicated time intervals. In WDM PONs, each ONU may send and receive data in a continuous manner, but only at dedicated wavelengths. A hybrid PON combining TDM with WDM can support higher capacity so that an increased number of users can be served by a single OLT with sufficient bandwidth per user. In such a time and wavelength division multiplexed (TWDM) PON, a WDM PON may be overlaid on top of a TDM PON. In other words, multiple wavelengths may be multiplexed together to share a single feeder fiber, and each wavelength may be shared by multiple users using TDM. TWDM PONs, however, present design and cost issues that must be addressed.

SUMMARY

In one embodiment, the disclosure includes an optical receiver comprising an optical port configured to receive an encoded optical signal, and a demodulation block indirectly coupled to the port and comprising a multiplexer, wherein the multiplexer is configured to receive an encoded electrical signal, wherein the encoded electrical signal is associated with the encoded optical signal, and wherein the encoded electrical signal is encoded using a code division multiple access (CDMA) scheme, receive a code associated with the scheme, perform a dot multiplication of the encoded electrical signal and the code, and generate a differential voltage based on the dot multiplication.

In another embodiment, the disclosure includes a method comprising receiving an encoded optical signal, converting the encoded optical signal into an encoded electrical signal, wherein the encoded electrical signal is encoded using a CDMA scheme, performing a dot multiplication of the encoded electrical signal and a code associated with the scheme, and generating a differential voltage based on the dot multiplication. The method may further comprise converting the differential voltage to a current, accumulating the current, generating a decoded electrical signal based on the current, comparing the decoded electrical signal to a predefined threshold, and generating original data based on the comparing.

In yet another embodiment, the disclosure includes an optical transmitter comprising a port configured to receive an input electrical signal, an orthogonal frequency-division multiplexing (OFDM) modulation block coupled to the port and configured to receive the input electrical signal, modulate the input electrical signal using OFDM, and generate a real digital electrical signal, a digital-to-analog (DAC) converter coupled to the OFDM modulation block and configured to convert the real digital electrical signal to an analog electrical signal, and a CDMA modulation block coupled to the DAC converter and configured to receive the analog electrical signal, modulate the analog electrical signal using CDMA, and generate an encoded electrical signal.

In yet another embodiment, the disclosure includes a method comprising receiving an input electrical signal, modulating the input electrical signal using OFDM, generating an electrical signal comprising a real portion but no complex portion, and modulating the electrical signal using CDMA to create a modulated electrical signal. The method may further comprise adding the modulated electrical signal to at least one additional signal to create a combined electrical signal, converting the combined electrical signal to an optical signal, and transmitting the optical signal.

In yet another embodiment, the disclosure includes an optical transmitter comprising a port configured to receive an input electrical signal, an OFDM modulation block coupled to the port and configured to, modulate the input electrical signal using OFDM, generate a real electrical signal, and generate an imaginary electrical signal, a first CDMA modulation block coupled to the OFDM modulation block and configured to modulate the real electrical signal using CDMA, and generate a real modulated electrical signal, and a second CDMA modulation block coupled to the OFDM modulation block and configured to modulate the imaginary electrical signal using CDMA, and generate an imaginary modulated electrical signal.

In yet another embodiment, the disclosure includes a method comprising receiving an optical signal, converting a first portion of the optical signal into a real analog signal, converting a second portion of the optical signal into an imaginary analog signal, performing a first dot multiplication of the real analog signal and a first code associated with a CDMA scheme to produce a real decoded analog signal, and performing a second dot multiplication of the imaginary analog signal and a second code associated with the CDMA scheme to produce an imaginary decoded analog signal.

In yet another embodiment, the disclosure includes a passive optical network (PON) comprising an optical line terminal (OLT), optical network units (ONUs) indirectly coupled to the OLT, and a control layer logically coupled to the OLT and the ONUs, implementing a CDMA scheme, and comprising an initialization block configured to connect the ONUs to the PON and prepare the ONUs to send and receive data, a dynamic bandwidth allocation block configured to allocate to the ONUs time slots for upstream transmission, a code assignment block configured to assign to the ONUs orthogonal codes associated with the scheme, and a rate adaptation block configured to indicate to the ONUs a pulse-amplitude modulation (PAM) order associated with the PON and adjust the PAM order based on a criterion. The criterion may be one of a signal-to-noise ratio (SNR), a bit error rate (BER), and signal power.

In yet another embodiment, the disclosure includes a method comprising modulating a signal using a PAM scheme, assigning to the signal an orthogonal code associated with a CDMA scheme, modulating the signal using the orthogonal code and the CDMA scheme, and adjusting an order associated with the PAM scheme based on at least one of an SNR, a BER associated with the signal, and a signal power.

In yet another embodiment, the disclosure includes a PON comprising an OLT, ONUs indirectly coupled to the OLT, and a control layer logically coupled to the OLT and the ONUs, implementing a CDMA scheme, implementing an OFDM scheme, and comprising an initialization block configured to connect the ONUs to the PON and prepare the ONUs to send and receive data, a dynamic bandwidth allocation block configured to allocate to the ONUs time slots for upstream transmission, a code assignment block configured to assign to the ONUs orthogonal codes associated with the CDMA scheme, and a rate adaptation block configured to indicate to the ONUs a quadrature amplitude modulation (QAM) order associated with the PON and adjust the QAM order based on a criterion. The criterion may be one of an SNR, a BER, and signal power.

In yet another embodiment, the disclosure includes a method comprising modulating a signal using a QAM scheme, assigning to the signal an orthogonal code associated with a CDMA scheme, modulating the signal using the orthogonal code and the CDMA scheme, and adjusting an order associated with the QAM scheme based on at least one of an SNR, a BER associated with the signal, and a signal power.

In yet another embodiment, the disclosure includes a communications system comprising a CO comprising a digital subscriber line (DSL) transceiver, a drop port (DP) communicatively coupled to the CO via an optical fiber, and a customer premises equipment (CPE) communicatively coupled to the DP via a twisted pair cabling and comprising a DSL receiver and a DSL transmitter.

In yet another embodiment, the disclosure includes a communications system comprising a CO comprising a coaxial transceiver, a DP communicatively coupled to the CO via an optical fiber, and a user equipment (UE) communicatively coupled to the DP via a coaxial cable and comprising a coaxial receiver and a coaxial transmitter.

In yet another embodiment, the disclosure includes a communications system comprising a CO comprising legacy equipment and a baseband unit (BBU), wherein the BBU comprises a cellular transceiver, and a CDMA modulation block indirectly coupled to the cellular transceiver, and a base station (BS) communicatively coupled to the CO via an optical fiber.

In yet another embodiment, the disclosure includes a communications system comprising a headend comprising a cable modem termination system (CMTS) and a first optical modulation/demodulation block, a fiber node (FN) communicatively coupled to the headend via an optical fiber, a first cable modem (CM) communicatively coupled to the FN via a coaxial cable, and a fiber modem (FM) communicatively coupled to the headend via an optical fiber and comprising a second optical modulation/demodulation block, and a second CM.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a table illustrating the logic of the multiplexer of FIG. 7 according to an embodiment of the disclosure.

FIG. 9 is a schematic diagram of a pulse-amplitude modulation (PAM) optical transmitter 900 employing CDMA.

DETAILED DESCRIPTION

Figure 1:
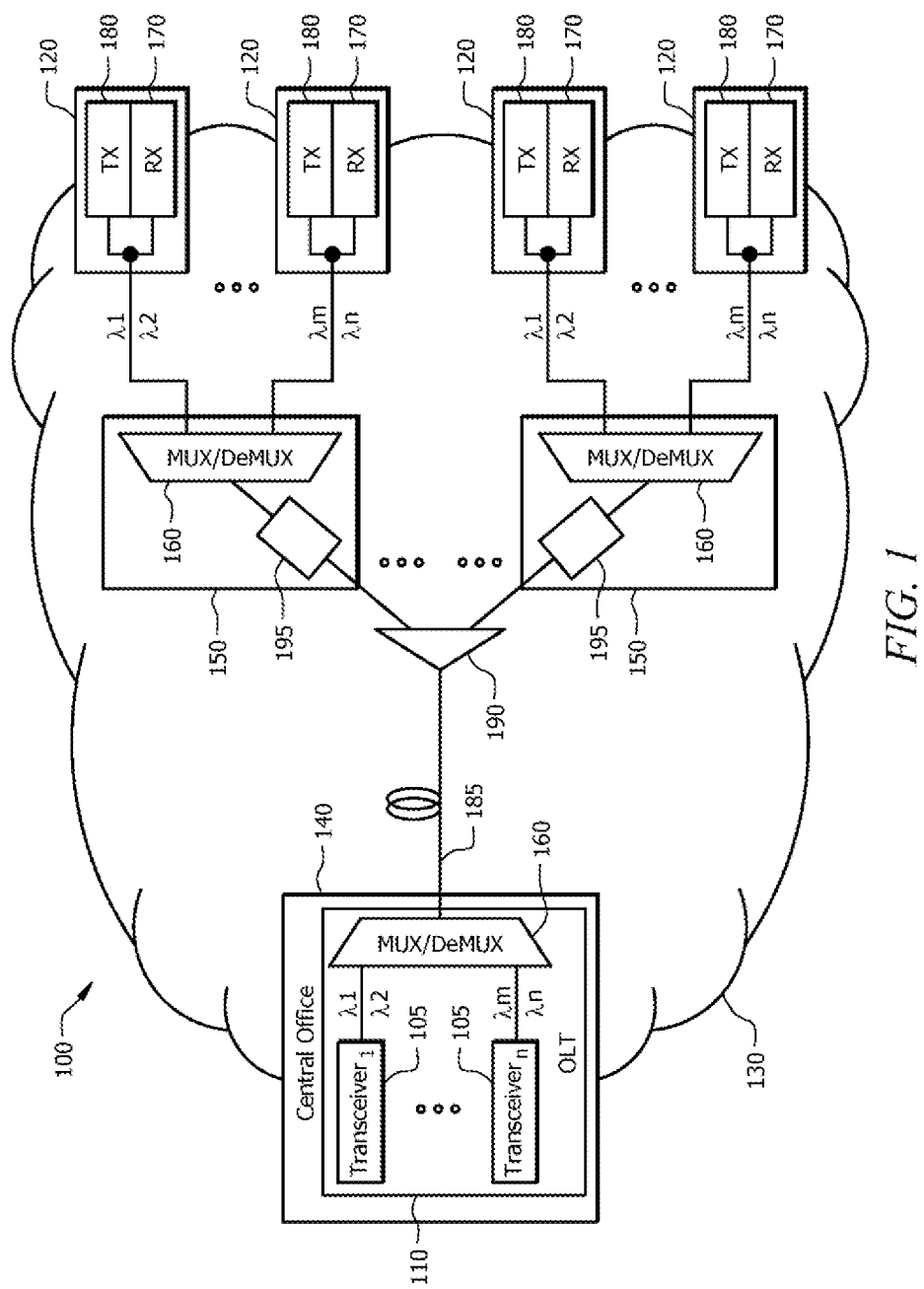
FIG. 1 is a schematic diagram of a PON.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Current PONs may have issues that limit their performance or keep costs high. First, PONs have developed from gigabit-capable PONs (GPONs) to 40 G GPONs. In such PONs, electrical signal bit rates may reach 12.5 gigahertz (GHz), which may near the limitation of current electrical and optical component manufacturing capabilities. Nonetheless, data rate demands continue to increase. To increase data rates without increasing costs, previous PON techniques have focused on non-return-to-zero (NRZ) modulation methods, which may offer increased data rates without employing high-speed and costly analog-to-digital converters (ADCs), DACs, and complicated data processing systems. Modulate and its derivatives may be used interchangeably with encode and its derivatives where appropriate, and demodulate and its derivatives may be used interchangeably with decode and its derivatives where appropriate. Other modulation methods such as CDMA, OFDM, and QAM, which may be more efficient than NRZ, may require the costly components. Accordingly, there is a need to increase PON data rates without significantly increasing costs.

Second, as described above, PONs may employ a point-to-multipoint architecture where a single OLT connects to multiple ONUs. When transmission occurs downstream from the OLT to the ONUs, the ONUs may remain on and process data at a high speed corresponding to the fiber. The physical layers of the ONU circuits may process all the data they receive and forward that data to the media access control (MAC) layers regardless of whether the data corresponds to the individual ONUs. The MAC layers of the ONU circuits may then process all the data they receive and forward the data to upper layers if the data corresponds to the individual ONUs. The unnecessary processing at the physical layers may cause unnecessary power consumption. At the same time, PONs may be designed based on a lowest possible power budget, but PONs may not actually operate under such a budget. For example, a GPON may be designed to meet a lowest power budget of −30 decibel milliwatt (dBm), which may correspond to a 1 dBm average transmit power, 20 kilometers (km) of fiber, and a 1:64 splitter ratio. In that case, the modulation efficiency may be 1 bit/Hertz (Hz) to guarantee a target bit error rate (BER). In many cases, though, GPONs may have increased power budgets, which may allow for modulation efficiencies of 2 bits/Hz or more and thus higher data rates. Current PONs may not be flexible enough to suit power budgets by changing the number of loading bits.

Third, current PONs may employ fiber all the way to individual homes. This method is expensive because it may require significant construction to lay fiber underground and in buildings. Other current PONs may employ fiber almost all the way to individual homes and use existing copper wires to reach the individual homes. This latter method is less expensive than the fiber to the home method and is referred to as fiber to the drop point (FTTdp) or fiber to the door (FTTD). The latter method may employ more specific technologies known as FTTx+Vector DSL, FTTx+G.Fast, or other technologies that may comprise remote equipment at the drop point or on the outside walls of the individual homes. This method is similar to fiber to the node (FTTN), but the remote equipment may be smaller and support fewer users. In addition, the remote equipment may be subject to higher temperatures, higher humidity, lack of power supply access, etc. Those conditions may require that the remote equipment have increased condition protection, less thermal emission, less power consumption, etc., which may increase design costs.

Disclosed herein are techniques, methods, and devices for improved optical systems. First, a disclosed technique may employ CDMA or a combination of CDMA and OFDM, and thus improve efficiency 2 to 10 times compared to NRZ, but without significantly increasing costs by avoiding the high-speed and costly ADCs, DACs, and complicated data processing systems. Second, a disclosed technique may allow for dynamically changing the number of loading bits in PONs employing CDMA or a combination of CDMA and OFDM in order to suit power budgets and guarantee target BERs. Third, a disclosed technique may provide for architectures that use legacy network infrastructure, but employ CDMA or a combination of CDMA and OFDM to improve data rates.

FIG. 1 is a schematic diagram of a PON 100. The PON 100 may be suitable for implementing the disclosed techniques. The PON 100 may comprise an OLT 110 located in a CO 140, a plurality of ONUs 120 located at the customer premises, and an ODN 130 that couples the OLTs 110 to the ONUs 120. The PON 100 may provide wavelength division multiplexing (WDM) capability by associating a downstream wavelength and an upstream wavelength with each transceiver 105 in the OLT 110 so that a plurality of wavelengths are present, combining those wavelengths into a single optical fiber cable 185, and distributing the plurality of wavelengths to a subset of the ONUs 120 through RNs 150. The PON 100 may provide TDMA capability for each subset of ONUs 120 associated with an OLT 110.

The PON 100 may be a communications network that does not require any active components to distribute data among the OLT 110, RNs 150, and ONUs 120. Instead, the PON 100 may use the passive optical components in the ODN 130 to distribute data among the OLTs 110, RNs 150, and ONUs 120. The PON 100 may be a Next Generation Access (NGA) system, such as a 10 gigabit per second (Gb/s) PON (e.g., XGPON), which may have a downstream bandwidth of about 10 Gb/s and an upstream bandwidth of about 2.5 Gb/s. Alternatively, the PON 100 may be any Ethernet-based network such as an Ethernet PON (EPON) defined by the Institute of Electrical and Electronics Engineers (IEEE) 802.3ah standard, a 10 Gb EPON as defined by the IEEE 802.3av standard, an asynchronous transfer mode PON (APON), a broadband PON (BPON) defined by the International Telecommunications Union (ITU) Telecommunications Standardization Sector (ITU-T) G.983 standard, a GPON defined by the ITU-T G.984 standard, a WDM PON (WPON), or a suitable after-arising technology, all of which are incorporated by reference in their entirety.

The CO 140 may be a physical building and may comprise servers and other backbone equipment (not shown) designed to service a geographical area with data transfer capability. The CO 140 may comprise a plurality of transceivers 105 and at least one multiplexer/demultiplexer (MUX/DeMUX) 160. The MUX/DeMUX 160 may be any suitable wavelength separator/combiner such as an arrayed waveguide grating (AWG). The MUX/DeMUX 160 at the CO 140 may combine the various wavelengths from the transceivers 105 into a single line to feed into the RNs 150.

The OLT 110 may be any device configured to communicate with the ONUs 120 and another network (not shown). Specifically, the OLT 110 may act as an intermediary between the other network and the ONUs 120. For instance, the OLT 110 may forward data received from the network to the ONUs 120 and forward data received from the ONUs 120 to the other network. Although the specific configuration of the OLT 110 may vary depending on the type of PON 100, in an embodiment, the OLT 110 may comprise a transmitter and a receiver. When the other network uses a network protocol such as Ethernet or Synchronous Optical Networking/Synchronous Digital Hierarchy (SONET/SDH) that differs from the PON protocol used in the PON 100, the OLT 110 may comprise a converter that converts the network protocol into the PON protocol. The OLT 110 converters may also convert the PON protocol into the network protocol. The OLT 110 may be typically located at a central location, such as the CO 140, but may be located at other locations as well.

The ODN 130 may be a data distribution system, which may comprise optical fiber cables 185, couplers, splitters, distributors, and/or other equipment. In an embodiment, the optical fiber cables 185, couplers, splitters, distributors, and/or other equipment may be passive optical components. Specifically, the optical fiber cables 185, couplers, splitters, distributors, and/or other equipment may be components that do not require any power to distribute data signals between the OLTs 110 and the ONUs 120. Alternatively, the ODN 130 may comprise one or a plurality of active components such as optical amplifiers and power splitters 190. The ODN 130 may typically extend from the OLTs 110 to the ONUs 120 in a branching configuration as shown in FIG. 1, but the ODN 130 may be alternatively configured in any other point-to-multipoint configuration.

The RNs 150 may be any components positioned within the ODN 130 that provide partial reflectivity, polarization rotation, or WDM capability. For example, the RNs 150 may comprise a MUX/DeMUX 160 and a rotator mirror 195. The MUX/DeMUX 160 may be any suitable wavelength separator/combiner such as an AWG. The rotator mirrors 195 may be any devices, such as a Faraday rotator and a partial reflective mirror, configured to rotate the polarization of light and/or reflect light. The rotator mirrors 195 may comprise a partially reflective component such as a partially reflective mirror or a splitter and a fully reflective mirror. Other suitable optical rotators and reflectors may be used instead of the rotator mirrors 195. The RNs 150 may exist closer to the ONUs 120 than to the CO 140, for example at the end of a road where multiple users reside, but the RNs 150 may also exist at any point in the ODN 130 between the ONUs 120 and the CO 140.

The ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer and forward data received from the customer to the OLT 110 via the RNs 150. Although the specific configuration of the ONUs 120 may vary depending on the type of PON 100, the ONUs 120 may comprise an optical transmitter 180 configured to send optical signals to the OLTs 110 and an optical receiver 170 configured to receive optical signals from the OLTs 110. Additionally, the ONUs 120 may comprise a converter that converts the optical signal into electrical signals for the customer, such as signals in the Ethernet or asynchronous transfer mode (ATM) protocol, and a second transmitter or receiver that may send and/or receive the electrical signals to a customer device. In some embodiments, ONUs 120 and optical network terminals (ONTs) are similar, so the terms may be used interchangeably. The ONUs 120 may be typically located at distributed locations such as the customer premises, but may be located at other locations as well.

Figure 2:
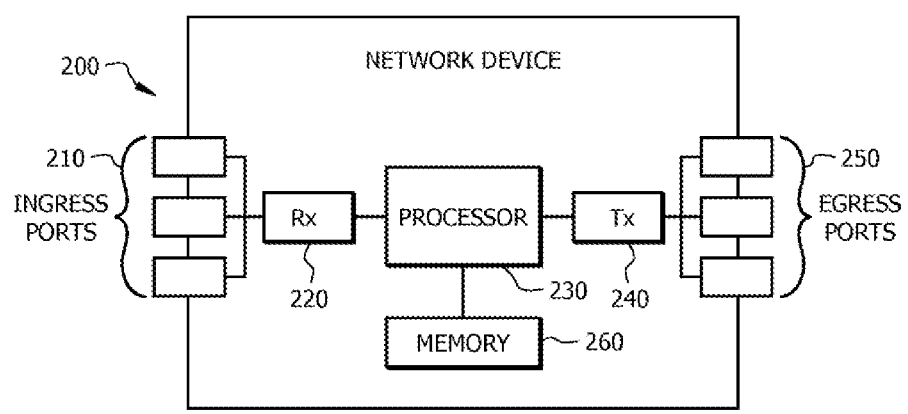
FIG. 2 is a schematic diagram of a network device.

FIG. 2 is a schematic diagram of a network device 200. The network device 200 may be suitable for implementing the disclosed techniques. The network device 200 may comprise a plurality of ingress ports 210 and/or receiver units (Rx) 220 for receiving data; a processor, logic unit, or central processing unit (CPU) 230 to process the data; a plurality of transmitter units (Tx) 240 and/or egress ports 250 for transmitting the data; and a memory 260 for storing the data. The network device 200 may also comprise optical-to-electrical (OTE) components (not shown) and/or electrical-to-optical (ETO) components (not shown) coupled to the ingress ports 210, receiver units 220, transmitter units 240, and/or egress ports 250 for egress or ingress of optical or electrical signals.

The processor 230 may be implemented by hardware and/or software. The processor 230 may be in communication with the ingress ports 210, receiver units 220, transmitter units 240, egress ports 250, and memory 260. The processor 230 may be implemented as one or more CPU chips, cores (e.g., as a multi-core processor), field-programmable gate arrays (FPGAs), application specific integrated circuits (ASICs), and/or digital signal processors (DSPs).

The memory 260 may comprise one or more disks, tape drives, or solid-state drives; may be used as an over-flow data storage device; may be used to store programs when such programs are selected for execution; and may be used to store instructions and data that are read during program execution. The memory 260 may be volatile and/or non-volatile and may be read-only memory (ROM), random-access memory (RAM), ternary content-addressable memory (TCAM), static random-access memory (SRAM), or any combination thereof.

Figure 3:
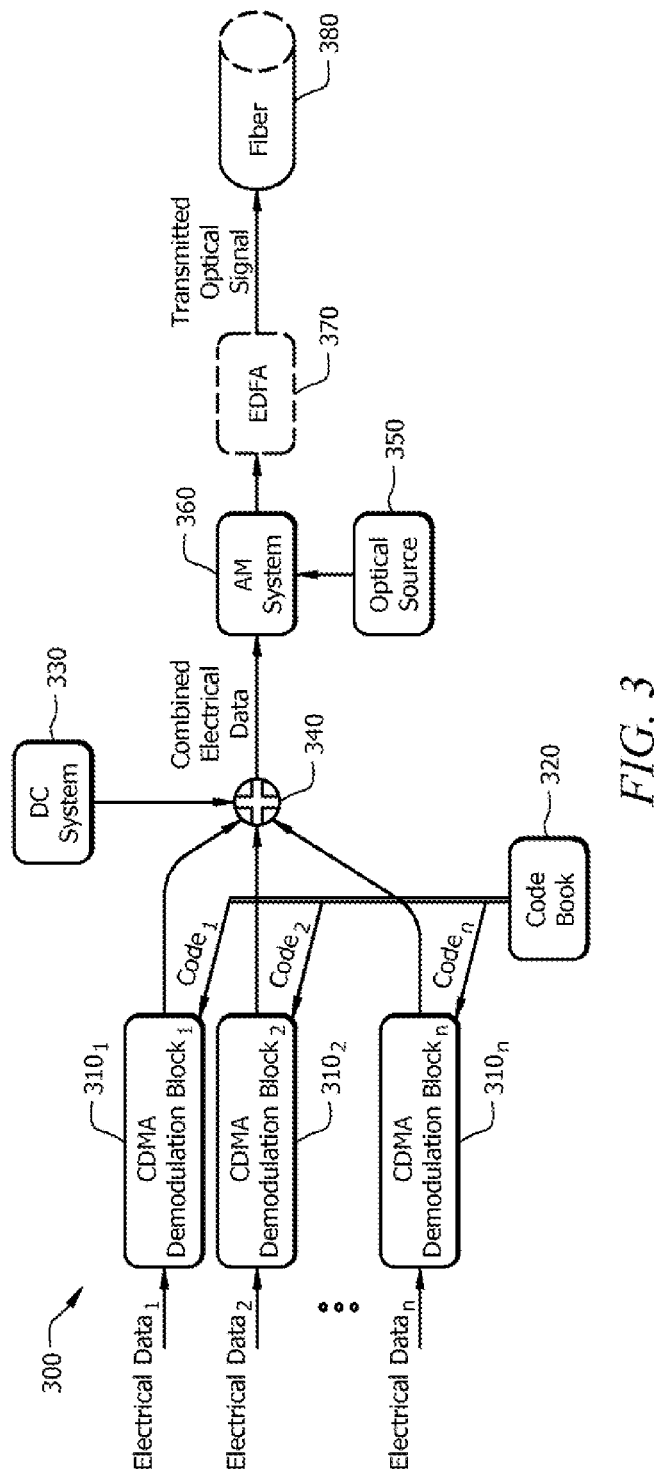
FIG. 3 is a schematic diagram of a binary optical transmitter employing code division multiple access (CDMA).

FIG. 3 is a schematic diagram of a binary optical transmitter 300 employing CDMA. The transmitter 300 may comprise CDMA modulation blocks$_{1-n}$ 310$_{1-n}$, a code book 320, a direct current (DC) system 330, an adder 340, an optical source 350, an amplitude modulation (AM) system 360, and an optional erbium-doped fiber amplifier (EDFA) 370. N may be any positive integer. N streams of electrical data may enter the CDMA modulation blocks$_{1-n}$ 310$_{1-n}$. In the CDMA modulation blocks$_{1-n}$ 310$_{1-n}$, each stream of electrical data may be encoded with a unique, orthogonal code from the code book 320 to create n streams of encoded electrical data. The n streams of encoded electrical data may exit the CDMA modulation blocks$_{1-n}$ 310$_{1-n}$ and be added together, along with a DC from the DC system 330, at the adder 340 to create a combined electrical signal. The DC may ensure a positive combined electrical signal as the AM system 360 may not be able to generate a negative optical signal. The combined electrical signal may enter the AM system 360. In addition, the optical source 350 may comprise a laser and may generate an optical source to feed into the AM system 360. The AM system 360 may then generate an optical signal that varies in intensity depending on the value of the combined electrical signal's current. If the signal-to-noise ratio (SNR) of the optical signal at a receiver is not high enough to reach a target BER, then the EDFA 370 may optionally be used to increase the transmission power of the optical signal. Finally, the optical signal may be transmitted to a fiber or other transmission medium 380 as the transmitted optical signal.

The code book 320 may employ any suitable orthogonal code. For example, the code book 320 may employ a Walsh orthogonal code. In that case, a basic Walsh orthogonal matrix may be as follows:

$$H_2 = \begin{bmatrix} 1 & 1 \\ 1 & -1 \end{bmatrix}.$$

A next-order Walsh orthogonal matrix may be generated based on the basic Walsh orthogonal matrix as follows:

$$H_4 = \begin{bmatrix} H_2 & H_2 \\ H_2 & -H_2 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

$H_4$ may be said to have four codes, code$_{1-4}$. Code$_1$ may correspond to the first row of $H_4$ and therefore be [1 1 1 1], code$_2$ may correspond to the second row of $H_4$ and therefore be [1 −1 1 −1], code$_3$ may correspond to the third row of $H_4$ and therefore be [1 1 −1 −1], and code$_4$ may correspond to the fourth row of $H_4$ and therefore be [1 −1 −1 1]. Any other order Walsh orthogonal matrix may be generated using the same method.

Figure 4:
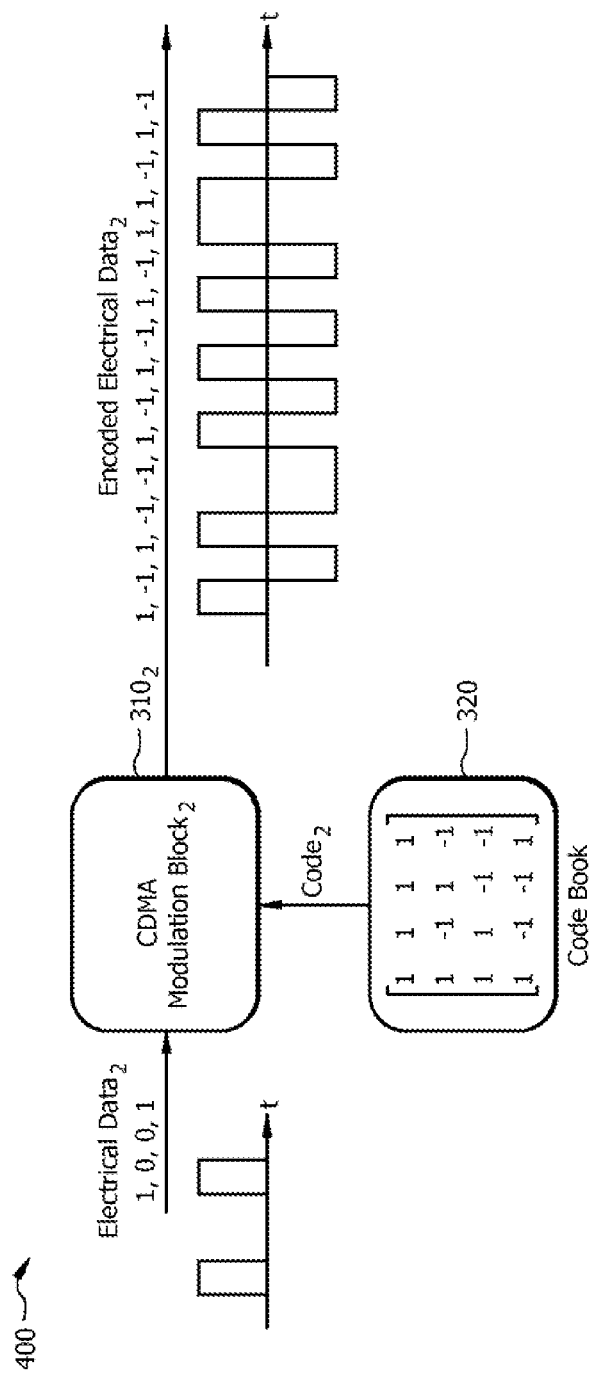
FIG. 4 is a schematic diagram of the CDMA modulation block$_2$ and the code book of FIG. 3.

FIG. 4 is a schematic diagram 400 of the CDMA modulation block$_2$ 310$_2$ and the code book 320 of FIG. 3. The electrical data$_2$ may be binary, and the code book 320 may comprise the Walsh orthogonal matrix $H_4$ described above. In an example, if the electrical data$_2$ is represented by the binary sequence 1, 0, 0, 1 and the code$_2$ corresponding to the electrical data$_2$ is the second row of $H_4$ and therefore [1 −1 1 −1], then the CDMA modulation block$_2$ 310$_2$ may encode each 1 bit of the electrical data$_2$ as 1, −1, 1, −1 and each 0 bit of the electrical data$_2$ as the reverse of 1, −1, 1, −1, namely −1, 1, −1, 1. Accordingly, the encoded electrical data$_2$ may result as shown in FIG. 4.

The chip rate of the encoded electrical data may be faster than the bit rate of the electrical data. The length of the orthogonal code may determine that difference in speed. For example, because the code$_2$ has a length of four, the chip rate of the encoded electrical data$_2$ may be four times faster than the bit rate of the electrical data$_2$. In other words, the length of the orthogonal code may be the same as the ratio of the chip rate to the bit rate. Also, because $H_4$ has four different orthogonal codes corresponding to its four rows, $H_4$ may encode four different streams of electrical data along four different transmission paths. Additionally, to ensure that the n streams of electrical data maintain similar and consistent transmission power, received SNR, and other metrics, each stream of encoded electrical data may have the same average power. In this example, because the data is binary, each 1 bit should have the same voltage, for example 1.2 volts (V), and each 0 bit should have the same voltage, for example 0 V.

Figure 5:
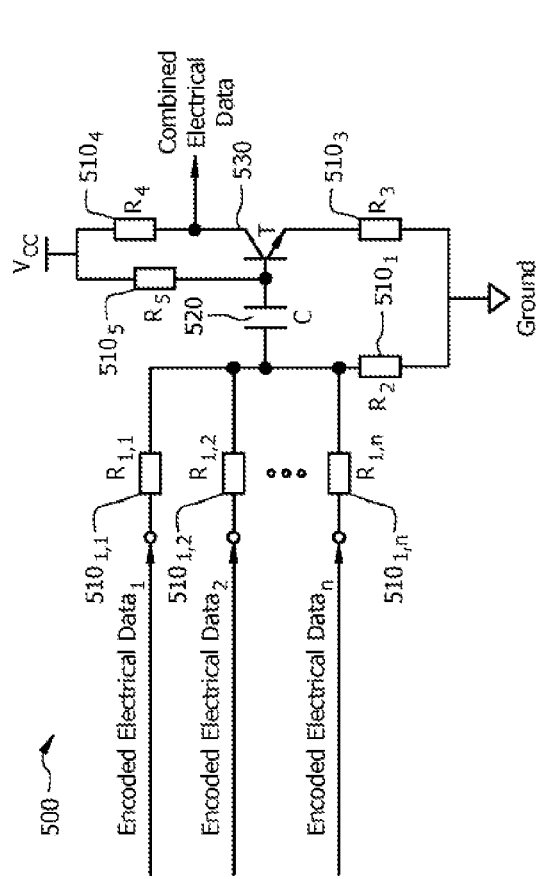
FIG. 5 is a schematic diagram of the adder of FIG. 3.

FIG. 5 is a schematic diagram of the adder 340 of FIG. 3. FIG. 5 may demonstrate one implementation of the adder 340, though it should be understood that other suitable implementations may be used. Similarly, when other implementations are provided herein, it should be understood that other suitable implementations may be used. The adder 340 may comprise resistors $R_{1,1-n}$ 510$_{1,1-n}$, resistors $R_{2-5}$ 510$_{2-5}$, a capacitor C 520, and a transistor T 530. The adder 340 may be an analog adder. Each stream of encoded electrical data from FIG. 3 may be connected to its respective $R_{1,1-n}$ 510$_{1,1-n}$, and combine into a single, analog signal with multiple amplitudes. The analog signal may then be amplified by T 530 to produce the combined electrical data mentioned above in FIG. 2. $R_{2-5}$ 510$_{2-5}$ may provide bias and allow T 530 to operate suitably.

Figure 6:
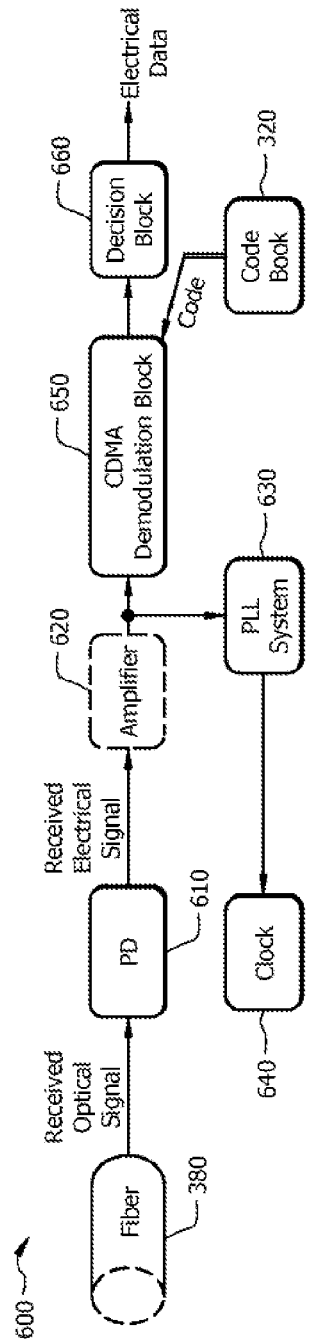
FIG. 6 is a schematic diagram of a binary optical receiver corresponding to the binary optical transmitter of FIG. 3.

FIG. 6 is a schematic diagram of a binary optical receiver 600 corresponding to the binary optical transmitter 300 of FIG. 3. The receiver 600 may comprise a photodiode (PD) 610, an optional amplifier 620, a phase lock loop (PLL) system 630, a first clock 640, a CDMA demodulation block 650, the code book 320, and a decision block 660. As used herein, the word "block" may refer to a circuit or other suitable system. When not described further, a block may be implemented by one of ordinary skill in the art, by employing the techniques described herein or otherwise, to carry out the described function. The transmitted optical signal may first arrive from the fiber 380 as the received optical signal. The PD 610 may convert the received optical signal into a received electrical signal, the amplifier 620 may amplify the amplitude of the electrical signal to create an amplified electrical signal, and the CDMA demodulation block 650 may decode the amplified electrical signal with a specified code from the code book 320 to create a decoded electrical signal. Finally, the decision block 660 may compare the decoded electrical signal with a predefined threshold to generate the original data from the n streams of data in FIG. 3. The PLL system 630 may synchronize the first clock 640 with a second clock (not shown) associated with the transmitter 300. The PLL system 630 may be replaced with any other suitable auxiliary synchronizing system.

Figure 7:
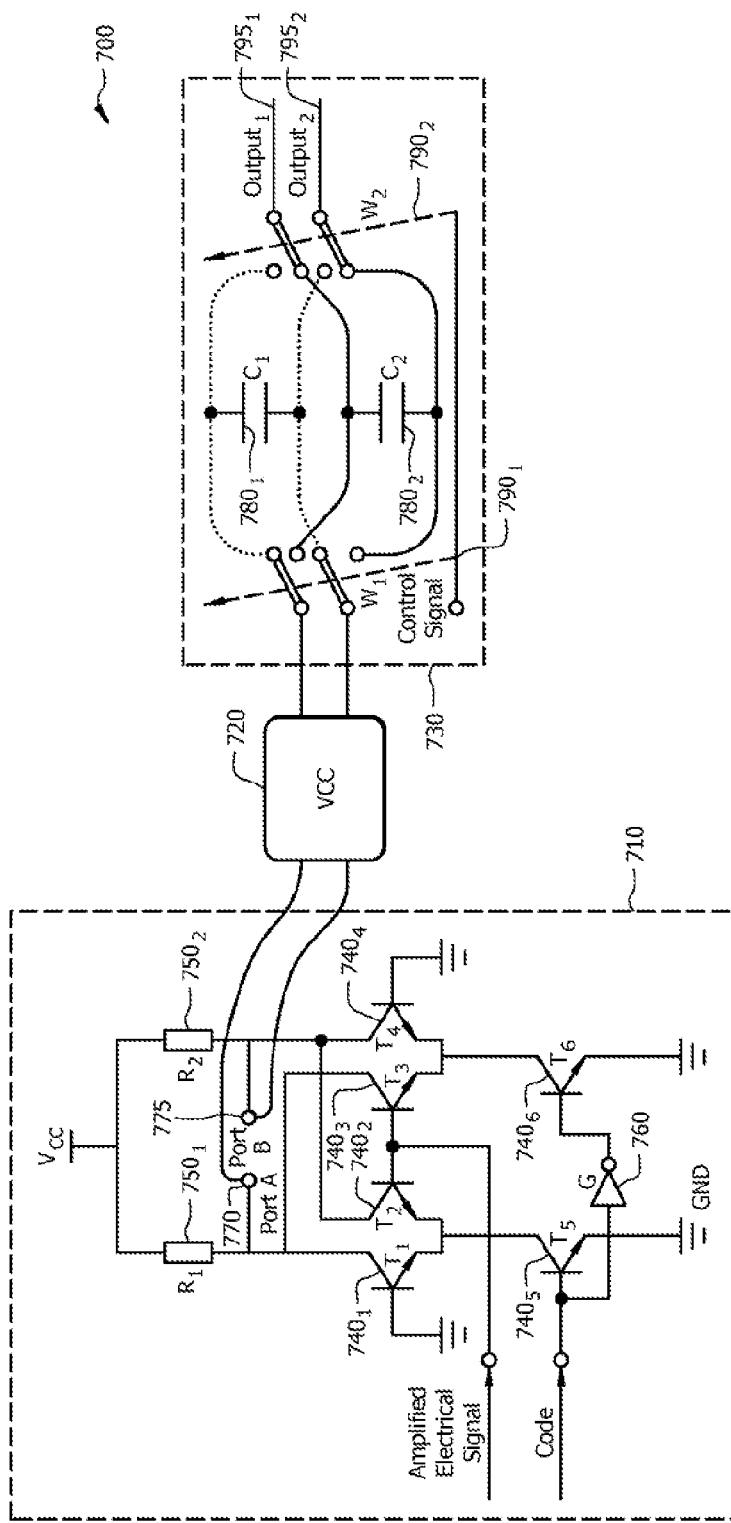
FIG. 7 is a schematic diagram of the CDMA demodulation block of FIG. 6 according to an embodiment of the disclosure.

FIG. 7 is a schematic diagram of the CDMA demodulation block 650 of FIG. 6 according to an embodiment of the disclosure. The CDMA demodulation block 650 may also be referred to as a correlator because it may correlate the amplified electrical signal with a specified code from the code book 320. The CDMA demodulation block 650 may implement dot-multiply and accumulation operations. The CDMA demodulation block 650 may be suitable for a binary, PAM, or other compatible system. The CDMA demodulation block 650 may comprise a multiplexer 710, a voltage-to-current converter (VCC) 720, and an accumulator 730.

The multiplexer 710 may comprise transistors $T_{1-6}$ $740_{1-6}$, resistors $R_{1-2}$ $750_{1-2}$, NOT logical gate G 760, port A 770, and port B 775. $T_{1-5}$ $740_{1-6}$, $R_{1-2}$ $750_{1-2}$, and G 760 may perform a dot-multiply function with the amplified electrical signal and the code from the code book 320. G 760 may perform a reverse operation of a logical signal.

If the code is a logical 1, then $T_6$ $740_6$ may be turned off because G 760 may reverse the logical 1 to a logical 0. Likewise, $T_3$ $740_3$ and $T_4$ $740_4$ may also be turned off. Because $T_5$ $740_5$ is before G 760, $T_5$ $740_5$ may be turned on. In that case, $T_1$ $740_1$ and $T_2$ $740_2$ may work as a differential amplifier. If the amplification factor is one, then the output differential voltage between port A 770 and port B 775 may be equal to the amplified electrical signal.

If the code is a logical 0, then $T_1$ $740_1$, $T_2$ $740_2$, and $T_5$ $740_5$ may be turned off because they are before G 760. Because $T_6$ $740_6$ is after G 760, $T_6$ $740_6$ may be turned on. In that case, $T_3$ $740_3$ and $T_4$ $740_4$ may work as a differential amplifier. If the amplification factor is one, then the output differential voltage between port A 770 and port B 775 may be equal to −1 times the amplified electrical signal.

FIG. 8 is a table 800 illustrating the logic of the multiplexer 710 of FIG. 7 according to an embodiment of the disclosure. As shown, if the code is a logical 1, then the output differential voltage, $V_{AB}$, between port A 770 and port B 775 may be equal to the amplified electrical signal. If the code is a logical 0, then $V_{AB}$ may be equal to −1 times the amplified electrical signal.

Returning to FIG. 7, the VCC 720 may be any suitable VCC known by one of ordinary skill in the art. The VCC 720 may convert $V_{AB}$ to an output current, $I_O$, and transmit $I_O$ to the accumulator 730. $I_O$ may be linear to $V_{AB}$ such that $I_O = \alpha V_{AB}$ where $\alpha$ is a gain factor and $V_{AB}$ is the output differential voltage as described above. Instead of the VCC 720, a current output multiplier or other suitable system may be used.

The accumulator 730 may comprise capacitors $C_{1-2}$ $780_{1-2}$, switches $W_{1-2}$ $790_{1-2}$, and outputs$_{1-2}$ $795_{12}$. $I_O$ may charge $C_1$ $780_1$ or $C_2$ $780_2$, and the generated charge may store in $C_1$ $780_1$ or $C_2$ $780_2$. The voltage of $C_1$ $780_1$ or $C_2$ $780_2$ may be $$V_C = \frac{1}{C}\int_{t_1}^{t_2} I_O dt,$$

where $t_1$ and $t_2$ are the beginning and ending times, respectively, of a code sequence and C is the capacitance of $C_1$ $780_1$ or $C_2$ $780_2$. In a chip period, $V_{AB}$ may be a constant, so $V_C$ during the code period may be the sum of $V_{AB}$ times a factor. $W_{1-2}$ $790_{1-2}$ may be controlled by a control signal. At time $t_1$ of a second code sequence, the control signal may drive $W_1$ $790_1$ to connect $C_1$ $780_1$ to the VCC 720. Then $C_1$ $780_1$ may receive, or accumulate, the dot-multiplied sequence and charge $C_1$ $780_1$ to $V_C$ according to the formula above. At the same time, the control signal may drive $W_2$ $790_2$ to connect $C_2$ $780_2$ to the outputs$_{1-2}$ $795_{1-2}$, and $V_C$ of $C_2$ $780_2$, which may have charged during a first, preceding code sequence according to the formula above, may transmit to the outputs$_{1-2}$ $795_{1-2}$. At time $t_2$ of the second code sequence, the control signal may drive $W_1$ $790_1$ to connect $C_2$ $780_2$ to the VCC 720 and drive $W_2$ $790_2$ to connect $C_1$ $780_1$ to the outputs$_{1-2}$ $795_{1-2}$. The outputs$_{1-2}$ $795_{1-2}$ may together provide a differential output voltage.

The CDMA demodulation block 650 may improve efficiency without significantly increasing costs. As an example, if the code book 320 comprises codes of length 32 and if the bit rate of the electrical data were 1 gigabits per second (Gb/s), then the chip rate would be 32 gigachips per second (Gcps). Then, if the CDMA demodulation block 650 were implemented in the digital domain instead of the analog domain, the sample rate of an ADC would be 64 GHz according to Nyquist's Law. Such a high-speed ADC, which the CDMA demodulation block 650 may help avoid, may add significant cost to the receiver 600.

FIG. 9 is a schematic diagram of a PAM optical transmitter 900 employing CDMA. The transmitter 900 may comprise mapping blocks$_{1-n}$ $910_{1-n}$, DACs$_{1-n}$ $920_{1-n}$, CDMA modulation blocks$_{1-n}$ $930_{1-n}$, a code book 940, an adder 950, an AM system 960, an optical source 970, and an optional EDFA 980. Unlike with the binary optical transmitter 300, the electrical data in the PAM optical transmitter 900 may be analog with multiple amplitudes, so the DACs$_{1-n}$ $920_{1-n}$ may perform digital-to-analog conversion before the CDMA modulation blocks$_{1-n}$ $930_{1-n}$. The mapping blocks$_{1-n}$ $910_{1-n}$ may provide a mapping from input binary bits to PAM signals. For example, if the transmitter 900 employs a PAM-4 system, then the mapping blocks$_{1-n}$ $910_{1-n}$ may employ the map shown in Table 1.

TABLE 1

Mapping Function Employed in the Mapping Blocks$_{1-n}$ $910_{1-n}$

| Input Binary Bits | PAM Signal |
|---|---|
| 00 | 1 |
| 01 | 2 |
| 10 | −1 |
| 11 | −2 |

In Table 1, if the electrical data$_1$ comprises the input binary bits 01, then the mapping block$_1$ $910_1$ may convert the input binary bits to a PAM signal of 2. Any other suitable mapping function may be used. If the PAM order is low, for example 4 or 8, then the mapping blocks$_{1-n}$ $910_1$ may not be necessary. The DACs$_{1-n}$ $920_{1-n}$ may be any suitable commercial DACs, but those DACs may be expensive.

Figure 10:
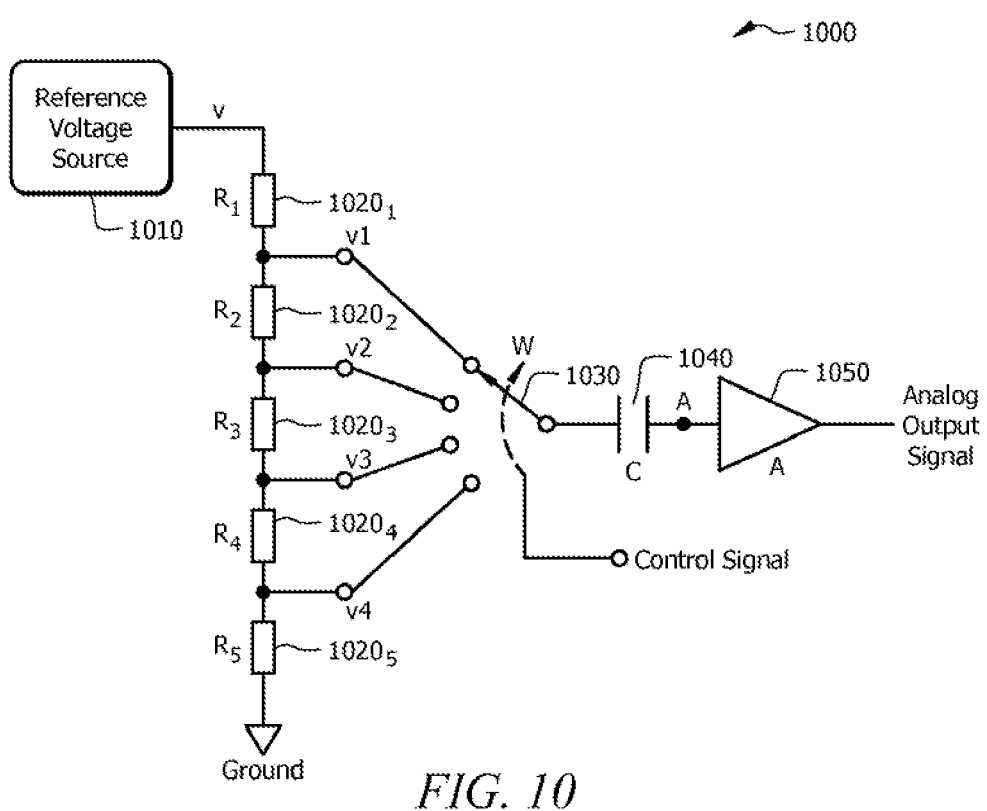
FIG. 10 is a schematic diagram of the DACs$_{1-n}$ of FIG. 9 according to an embodiment of the disclosure.

FIG. 10 is a schematic diagram of the DACs$_{1-n}$ $920_{1-n}$ of FIG. 9 according to an embodiment of the disclosure. The DAC $920_{1-n}$ may be one of many suitable options for the DACs$_{1-n}$ $920_{1-n}$. The DAC $920_{1-n}$ may comprise a reference voltage source 1010, resistors $R_{1-5}$ $1020_{1-5}$, a switch W 1030, a capacitor C 1040, and an amplifier A 1050. The reference voltage source 1010 may provide a low noise voltage, v, which may be fed into the resistance network of $R_{1-5}$ $1020_{1-5}$ to create the voltages, $v_{1-5}$, as shown. The control signal may then drive W 1030 to connect C 1040 to a desired voltage among $v_{1-5}$. For example, $v_4$ may be selected when the control signal is −2, $v_3$ may be selected when the control signal is −1, $v_2$ may be selected when the control signal is 1, and $v_1$ may be selected when the control signal is 2. The output of W 1030 may be a serial voltage of $v_1$, $v_2$, $v_3$, and $v_4$ in the time domain when the control signal is a sequence in the time domain. The voltage sequence may be a positive sequence, but may become an alternating current sequence after passing through C 1040. Once the electrical data is random, the absolute value of each sequence sample at point A may have only two values. Then the voltage value may be amplified by A 1050 and produce an analog output signal.

Figure 11:
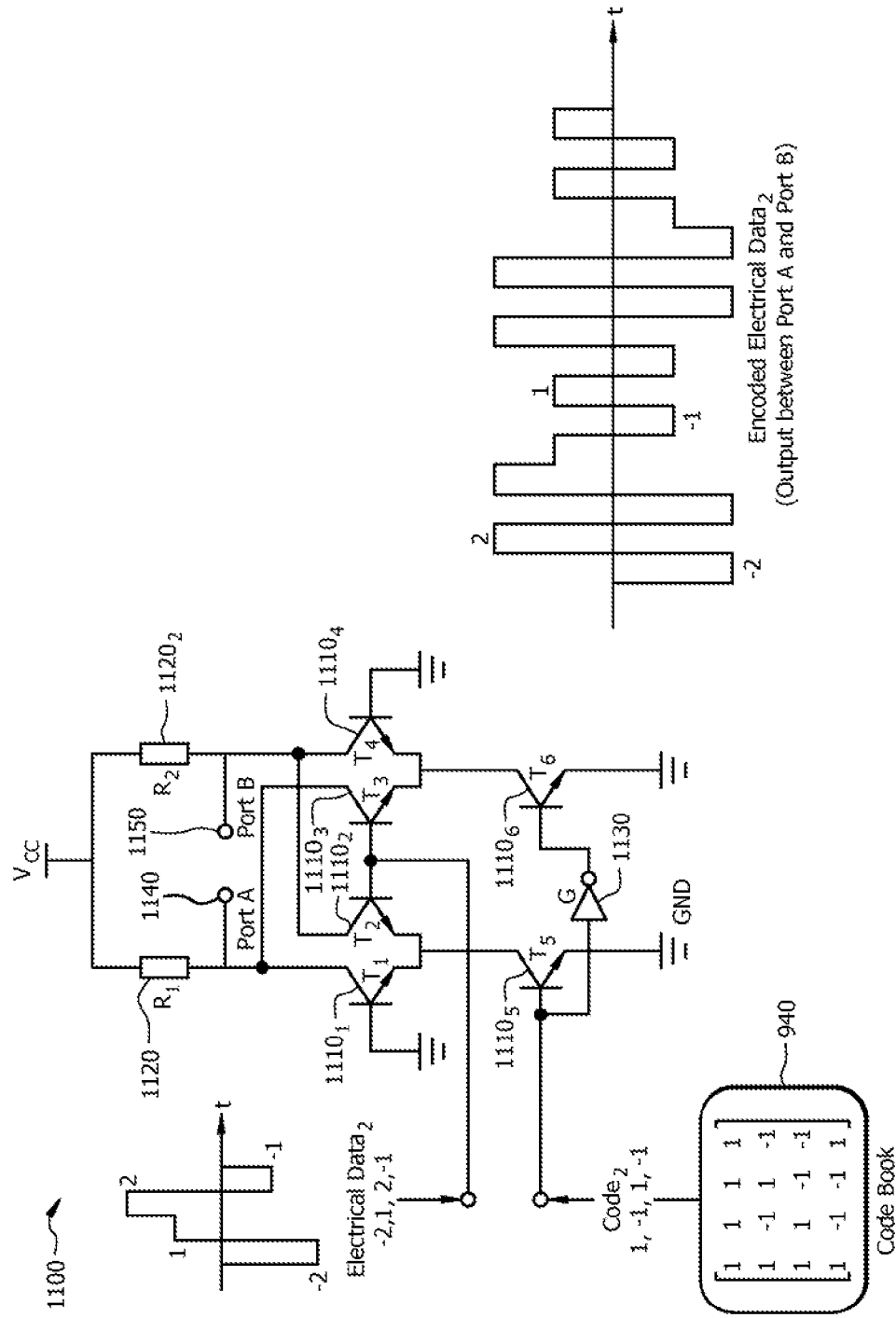
FIG. 11 is a schematic diagram of the CDMA modulation blocks$_{1-n}$ of FIG. 9 according to an embodiment of the disclosure.

FIG. 11 is a schematic diagram of the CDMA modulation blocks$_{1-n}$ 930$_{1-n}$ of FIG. 9 according to an embodiment of the disclosure. The CDMA modulation blocks$_{1-n}$ 930$_{1-n}$ may have a structure similar to the multiplexer 710 and may encode data similarly to the CDMA modulation blocks$_{1-n}$ 310$_{1-n}$ as shown in FIG. 4. The CDMA modulation blocks$_{1-n}$ 930$_{1-n}$ may each comprise transistors $T_{1-6}$ 1110$_{1-6}$, resistors $R_{1-2}$ 1120$_{1-2}$, NOT logical gate G 1130, port A 1140, and port B 1150. In an example, the CDMA modulation block$_2$ 930$_2$ may receive the electrical data$_2$, and the code book 940 may comprise the Walsh orthogonal matrix $H_4$ described above. If the electrical data$_2$ is represented by the PAM sequence −2, 1, 2, −1 and the code$_2$ corresponding to the electrical data$_2$ is the second row of $H_4$ and therefore [1 −1 1 −1], then the CDMA modulation block$_2$ 930$_2$ may encode each 1 bit of the electrical data$_2$ as 1, −1, 1, −1; each 2 bit of the electrical data$_2$ as two times 1, −1, 1, −1, namely 2, −2, 2, −2; each −1 bit of the electrical data$_2$ as the reverse of 1, −1, 1, −1, namely −1, 1, −1, 1; and each −2 bit of the electrical data$_2$ as two times −1, 1, −1, 1, namely −2, 2, −2, 2. Accordingly, the encoded electrical data$_2$ may result as shown in FIG. 11. Returning to FIG. 9, the adder 950, the AM system 960, the optical source 970, and the EDFA 980 may function similarly to the adder 340, the optical source 350, the AM system 360, and the EDFA 370, respectively, of FIG. 3. Finally, the optical signal may be transmitted to a fiber or other transmission medium 990 as the transmitted optical signal.

Figure 12:
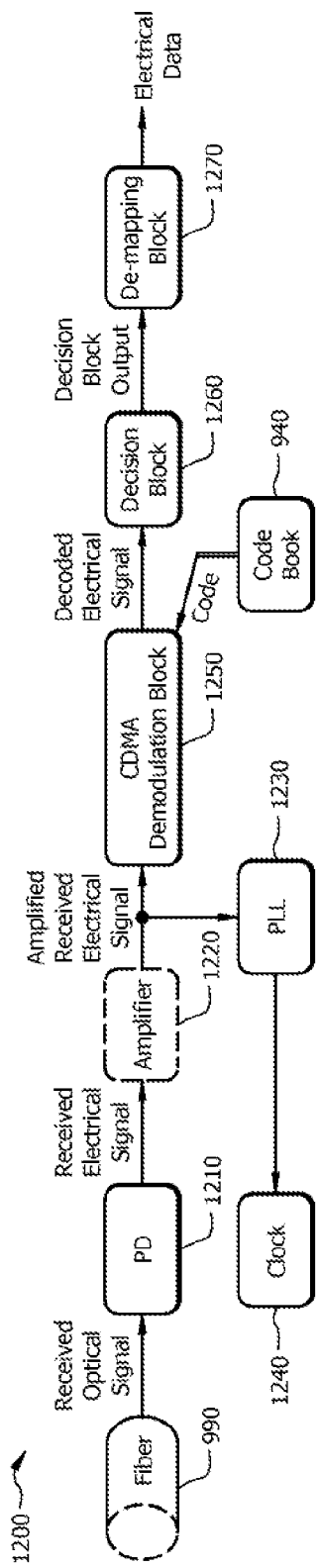
FIG. 12 is a schematic diagram of a PAM optical receiver corresponding to the PAM optical transmitter of FIG. 9.

FIG. 12 is a schematic diagram of a PAM optical receiver 1200 corresponding to the PAM optical transmitter 900 of FIG. 9. The receiver 1200 may comprise a PD 1210, an optional amplifier 1220, a PLL system 1230, a first clock 1240, a CDMA demodulation block 1250, the code book 940, a decision block 1260, and a de-mapping block 1270. The transmitted optical signal may first arrive from the fiber 990 as the received optical signal. The PD 1210, amplifier 1220, PLL system 1230, first clock 1240, CDMA demodulation block 1250, and code book 940 may function similarly to the PD 610, amplifier 620, PLL system 630, first clock 640, CDMA demodulation block 650, and code book 320, respectively, of FIG. 6; however, the decision block 1260 may perform differently from the decision block 660 described above, and the de-mapping block 1270 may not be found in the receiver 600.

Figure 13:
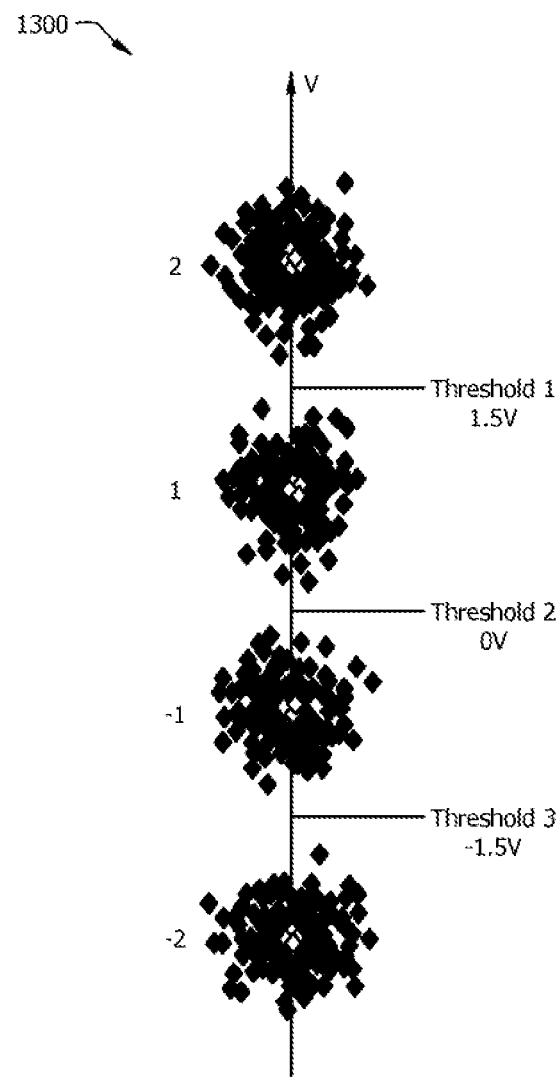
FIG. 13 is a graphical illustration of thresholds used in the decision block of FIG. 12.

FIG. 13 is a graphical illustration 1300 of thresholds used in the decision block 1260 of FIG. 12. The decision block 1260 may comprise multiple thresholds because PAM signals may have multiple amplitudes. FIG. 13 shows three thresholds, which may be suitable for PAM-4 modulation. Threshold 1 may be at 1.5 V, threshold 2 may be at 0 V, and threshold 3 may be at −1.5 V. When the decoded electrical signal is greater than threshold 1, then the decision block 1260 may transmit a 2 bit. When the decoded electrical signal is less than threshold 1 but greater than threshold 2, then the decision block 1260 may transmit a 1 bit. When the decoded electrical signal is less than threshold 2 but greater than threshold 3, then the decision block 1260 may transmit a −1 bit. When the decoded electrical signal is less than threshold 3, then the decision block 1260 may transmit a −2 bit. The 2, 1, −1, and −2 bits may be referred to as decision block 1260 outputs.

Returning to FIG. 12, the de-mapping block 1270 may receive the decision block 1260 outputs; apply the same map used in the transmitter 900, for example, the map in Table 1 above; and produce binary bits. In that case, a decision block 1260 output of 2 may correspond to binary bits 01, a decision block 1260 output of 1 may correspond to binary bits 00, a decision block 1260 output of −1 may correspond to binary bits 10, and a decision block 1260 output of −2 may correspond to binary bits 11. The binary bits 01, 00, 10, and 11 may correspond to the original electrical data of FIG. 9.

Figure 14:
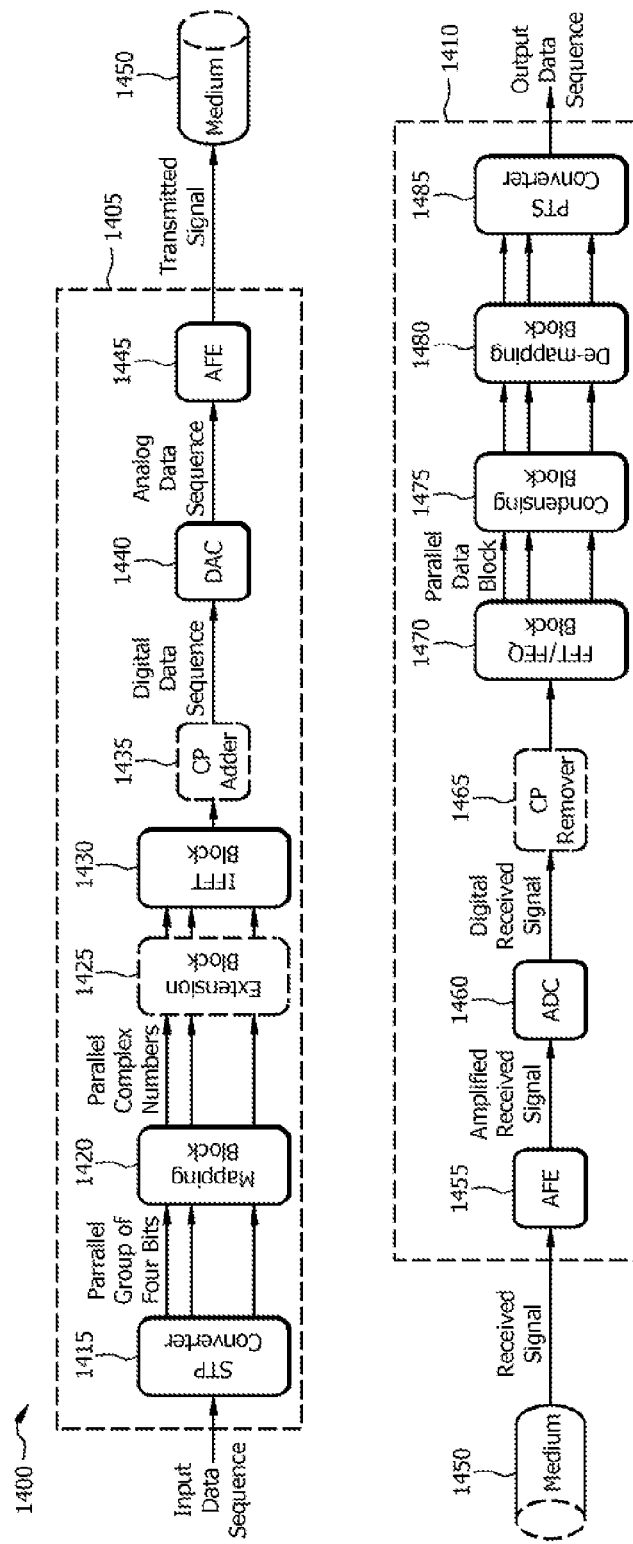
FIG. 14 is a schematic diagram of a system employing orthogonal frequency-division multiplexing (OFDM) modulation.

FIG. 14 is a schematic diagram of a system 1400 employing OFDM. The system 1400 may generally comprise a transmitter 1405 and a receiver 1410. The transmitter 1405 may comprise a serial-to-parallel (STP) converter 1415, a mapping block 1420, an optional extension block 1425, an inverse fast Fourier transform (IFFT) block 1430, an optional cyclic prefix (CP) adder 1435, a DAC 1440, and an analog front end (AFE) 1445.

The STP converter 1415 may convert the input data sequence to a parallel data block. The parameters of the system 1400, such as the number of subcarriers and the loading of bits of each subcarrier, may determine the format of the conversion. For example, if the input data sequence comprises four subcarriers and each subcarrier loads four bits, then the STP converter 1415 may select 16 bits from the input data sequence at a time and convert the 16 selected bits into four parallel groups of four bits each.

Figure 15:
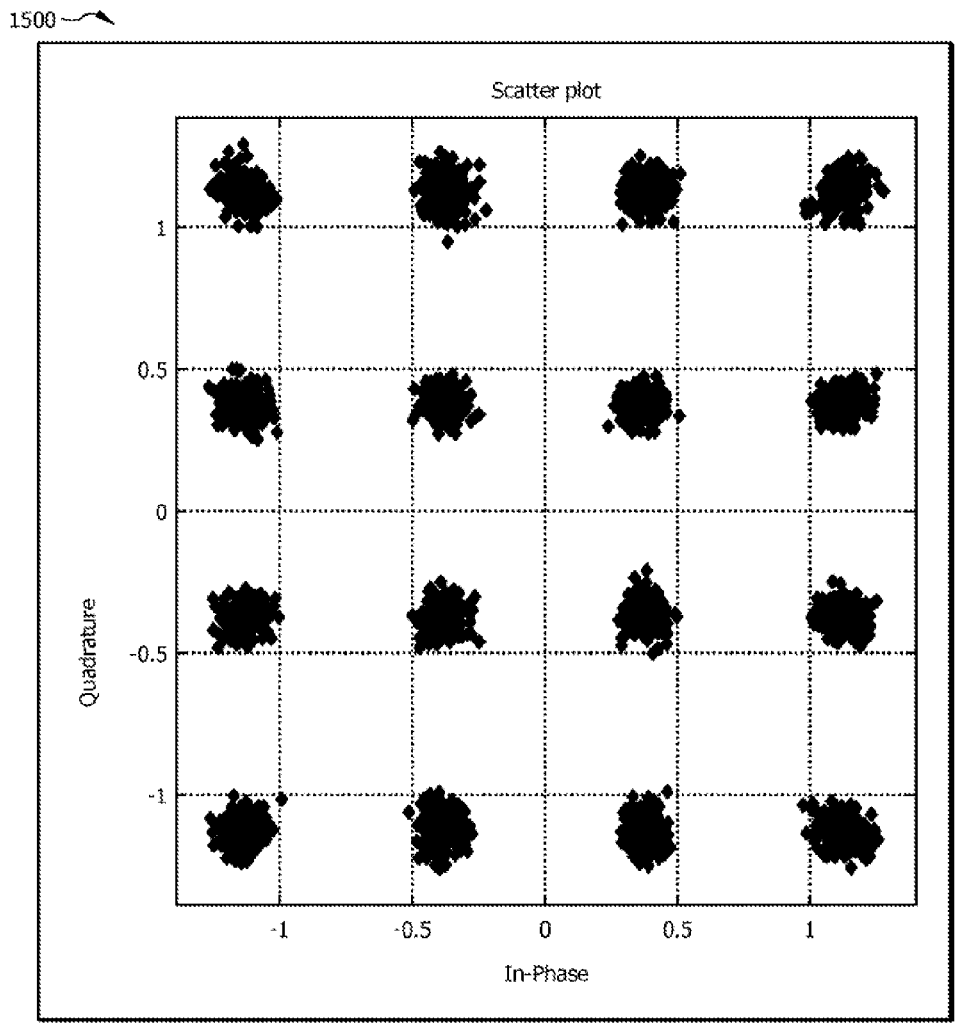
FIG. 15 is a graphical illustration of a constellation map.

The mapping block 1420 may then, according to a predefined rule, map the four bits of the four parallel groups to complex coordinates on a constellation map. The predefined rule should be employed in both the transmitter 1405 and the receiver 1410. Using the constellation map, the mapping block 1420 may generate parallel complex numbers. FIG. 15 is a graphical illustration of a constellation map 1500. The map 1500 may show 16 general points where each point may correspond to an in-phase value and a quadrature value.

Returning to FIG. 14, the extension block 1425 may be used to guarantee that the output of the IFFT block 1430 is a real data sequence, as opposed to an imaginary or complex data sequence. The extension block 1425 may do so by implementing a symmetric conjugate operation on the parallel complex numbers, thus doubling the length of the sequence. The extension block 1425 may be optional if, for example, the system 1400 employs IQ modulation. In IQ modulation, I may represent the in-phase component of a waveform, and Q may represent the quadrature component of a waveform. The in-phase component and the quadrature component may be orthogonal to each other. In that case, the IFFT block 1430 may modulate the real parts of the parallel complex numbers with the in-phase part and modulate the imaginary parts of the parallel complex numbers with the quadrature part.

The IFFT block 1430 may perform an IFFT as known by one of ordinary skill in the art. As mentioned above, the IFFT block 1430 may produce a real data sequence if the extension block 1425 is present. Otherwise, the IFFT block 1430 may produce a complex data sequence.

The CP adder 1435 may copy partial data samples from the ends of data sequences and add those partial data samples to the beginning of the data sequences. The added portion may be referred to as the CP. By doing this, the CP adder 1435 may reduce intersymbol interference (ISI). At the same time, the CP adder 1435 may increase the length of the data sequences, which may decrease the efficiency of the system 1400. If the output of the IFFT block 1430 is a complex data sequence, then the CP adder 1435 may operate on both the real part and the imaginary part of the complex data sequence. The CP adder 1435 may be optional because it may not be used if the system 1400 does not suffer from ISI.

The DAC 1440 may convert digital data sequences received from the CP adder 1435 or IFFT block 1430 to analog data sequences. Finally, the AFE 1445 may amplify the analog data sequences; shift the baseband signal of the analog data sequences to a pass-band signal, which may transmit at a higher central frequency; and transmit the analog data sequences to a transmission medium 1450 as the transmitted signal.

The receiver 1410 may comprise an AFE 1455, an ADC 1460, a CP remover 1465, an FFT/frequency domain equalizer (FEQ) block 1470, a condensing block 1475, a de-mapping block 1480, and a parallel-to-serial (PTS) converter 1485. The transmitted optical signal may first arrive from the transmission medium 1450 as the received signal. The AFE 1455 may amplify the received signal to create the amplified received signal because the signal may attenuate across the medium 1450. The ADC 1460 may convert the amplified received signal to a digital received signal. The CP remover 1465 may be used if the corresponding CP adder 1435 is used. In that case, the CP remover 1465 may remove the CP from the digital received signal.

The FFT/FEQ block 1470 may convert the digital received signal into a parallel data block in the frequency domain and compensate amplitude attenuation and phase rotation caused by the transmission medium 1450. If the extension block 1425 is present in the transmitter 1405, then the input to the FFT/FEQ block 1470 may be a real signal sequence and the parallel data block produced by the FFT/FEQ block 1470 may comprise conjugate symmetric complex numbers, the second half being the conjugate of the first half. In that case, the condensing block 1475 may remove the conjugate half of the parallel data block produced from the FFT/FEQ block 1470 so that the parallel data block is halved. The condensing block 1475 may be optional because it may not be used if the transmitter 1405 does not comprise the extension block 1425. Alternatively to combining both the FFT and the FEQ functions in the FFT/FEQ block 1470, the FEQ function may succeed the condensing block 1475.

The de-mapping block 1480 may apply the same pre-defined rule used in the mapping block 1420 of the transmitter 1405 and convert the complex numbers received from the condensing block 1475 into a data block. The PTS converter 1485 may convert the parallel data block received from the de-mapping block 1480 into a serial output data sequence.

Figure 16:
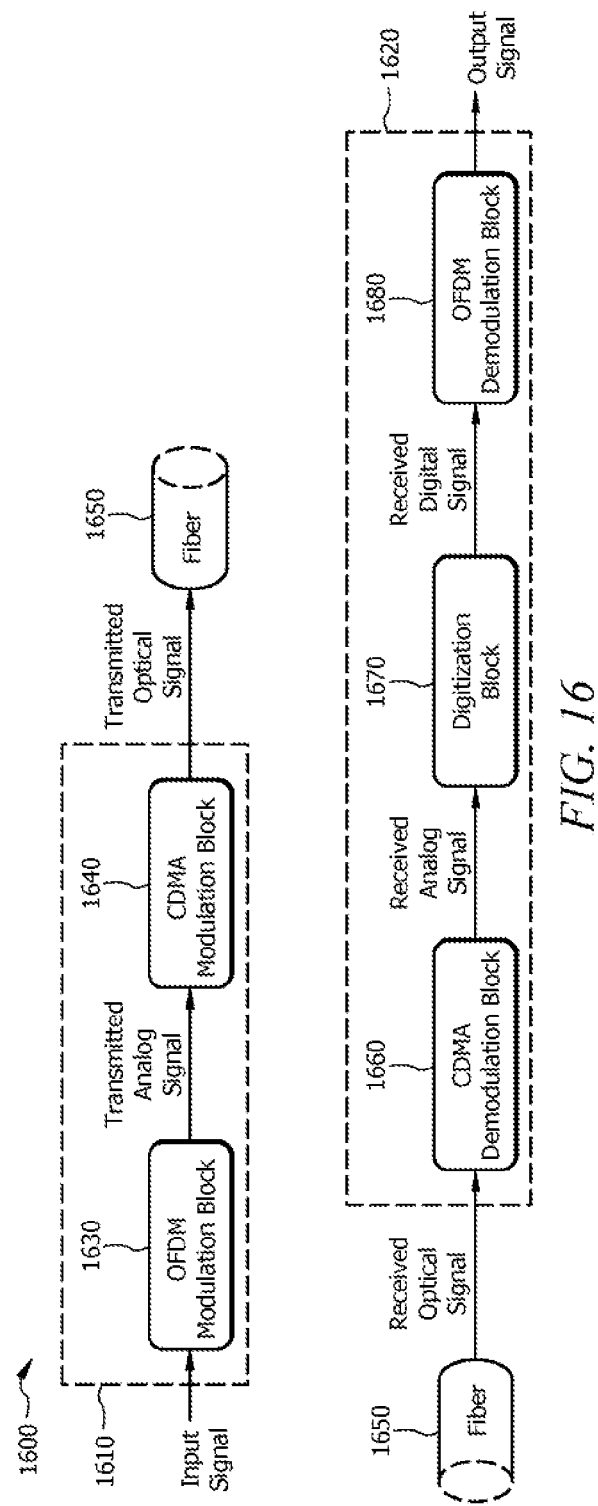
FIG. 16 is a simplified schematic diagram of a system employing OFDM and CDMA according to an embodiment of the disclosure.

FIG. 16 is a simplified schematic diagram of a system 1600 employing OFDM and CDMA according to an embodiment of the disclosure. The system 1600 may generally comprise a transmitter 1610 and a receiver 1620. The transmitter 1610 may comprise an OFDM modulation block 1630 and a CDMA modulation block 1640. The OFDM modulation block 1630 may modulate an input signal to produce a transmitted analog signal as described for the transmitter 1405. The CDMA modulation block 1640 may modulate the transmitted analog signal received from the OFDM modulation block 1630 to produce a transmitted optical signal as described for FIG. 9. The CDMA modulation block 1640 may then transmit the transmitted optical signal to a fiber or other transmission medium 1650.

The receiver 1620 may comprise a CDMA demodulation block 1660, a digitization block 1670, and an OFDM demodulation block 1680. The transmitted optical signal may arrive from the fiber 1650 as the received optical signal. The CDMA demodulation block 1660 may demodulate the received optical signal to produce a received analog signal as described for FIG. 12. The digitization block 1670 may digitize the received analog signal to produce a received digital signal. The OFDM demodulation block 1680 may demodulate the received digital signal to produce an output signal as described for the receiver 1410.

As described above, the ratio of chip rate to the bit rate may be the same as the length of the orthogonal code. As a result, before the CDMA modulation block 1640 and after the CDMA demodulation block 1660, the bit rate may be lower than the chip rate. Consequently, the OFDM modulation block 1630 and OFDM demodulation block 1680 may operate at a relatively lower speed, which may provide for a lower cost and power consumption. For example, if the orthogonal code length is 32 and the chip rate is 10 GHz, then the OFDM sampling rate may be 10 GHz/32, or 312.5 megahertz (MHz). ADCs and DACs with 312.5 MHz sampling rates may be easier to obtain and cheaper compared to ADCs and DACs with 20 GHz sampling rates.

Figure 17:
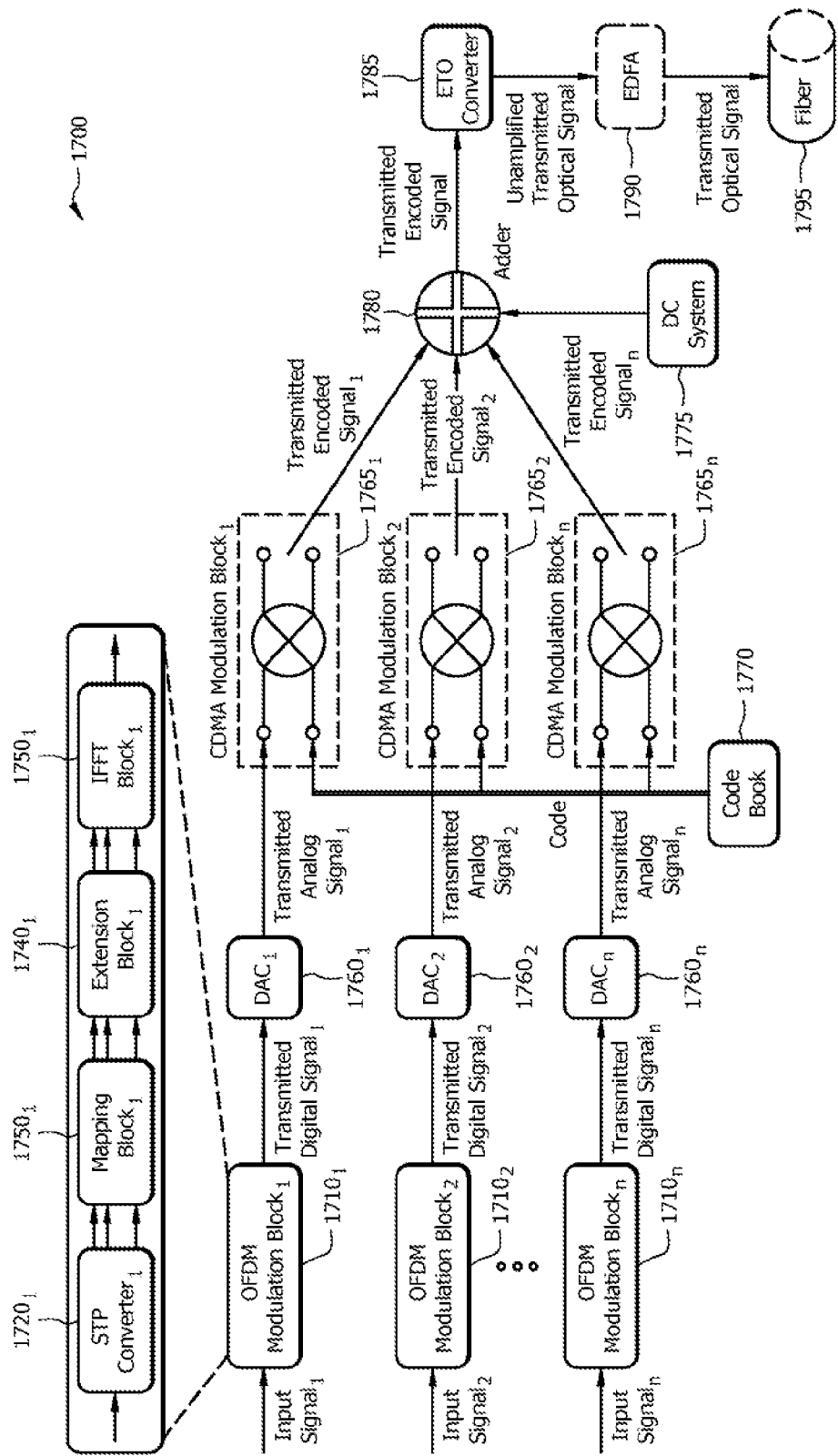
FIG. 17 is a detailed schematic diagram of the transmitter of FIG. 16 according to an embodiment of the disclosure.

FIG. 17 is a detailed schematic diagram of the transmitter 1610 of FIG. 16 according to an embodiment of the disclosure. The transmitter 1610 may comprise OFDM modulation blocks$_{1-n}$ 1710$_{1-n}$, DACs$_{1-n}$ 1760$_{1-n}$, CDMA modulation blocks$_{1-n}$ 1765$_{1-n}$, a code book 1770, a DC system 1775, an adder 1780, an ETO converter 1785, and an optional EDFA 1790. The OFDM modulation blocks$_{1-n}$ 1710$_{1-n}$ may comprise STP converters 1720$_{1-n}$, mapping blocks$_{1-n}$ 1730$_{1-n}$, extension blocks$_{1-n}$ 1740$_{1-n}$, and IFFT blocks$_{1-n}$ 1750$_{1-n}$, which may function similarly to the STP converter 1415, mapping block 1420, extension block 1425, and IFFT block 1430, respectively, of FIG. 14. Along with the DACs$_{1-n}$ 1760$_{1-n}$, which are shown separately, the OFDM modulation blocks$_{1-n}$ 1710$_{1-n}$ may produce the transmitted analog signals$_{1-n}$ as described for the transmitter 1405. The extension blocks$_{1-n}$ 1740$_{1-n}$ may guarantee that the output of the IFFT blocks$_{1-n}$ 1750$_{1-n}$ are real data signals.

The CDMA modulation blocks$_{1-n}$ 1765$_{1-n}$ may perform a dot multiplication of the analog signals$_{1-n}$ and an orthogonal code from the code book 1770 to produce the transmitted encoded signals$_{1-n}$ as described for FIGS. 9 and 11. If the orthogonal code is of length 32, then the frequency of the transmitted encoded signals$_{1-n}$ may be 32 times faster than that of the transmitted analog signals$_{1-n}$. The adder 1780 may add the transmitted encoded signals$_{1-n}$ with a DC from the DC system 1775 to produce a transmitted encoded signal as described for FIG. 5. The DC may ensure a positive transmitted encoded signal. The ETO converter 1785 may convert the transmitted encoded signal into an unamplified transmitted optical signal. The EDFA 1790 may optionally be used to increase the transmission power of the unamplified transmitted optical signal to produce the transmitted optical signal. Finally, the transmitted optical signal may be transmitted to a fiber or other transmission medium 1795.

Figure 18:
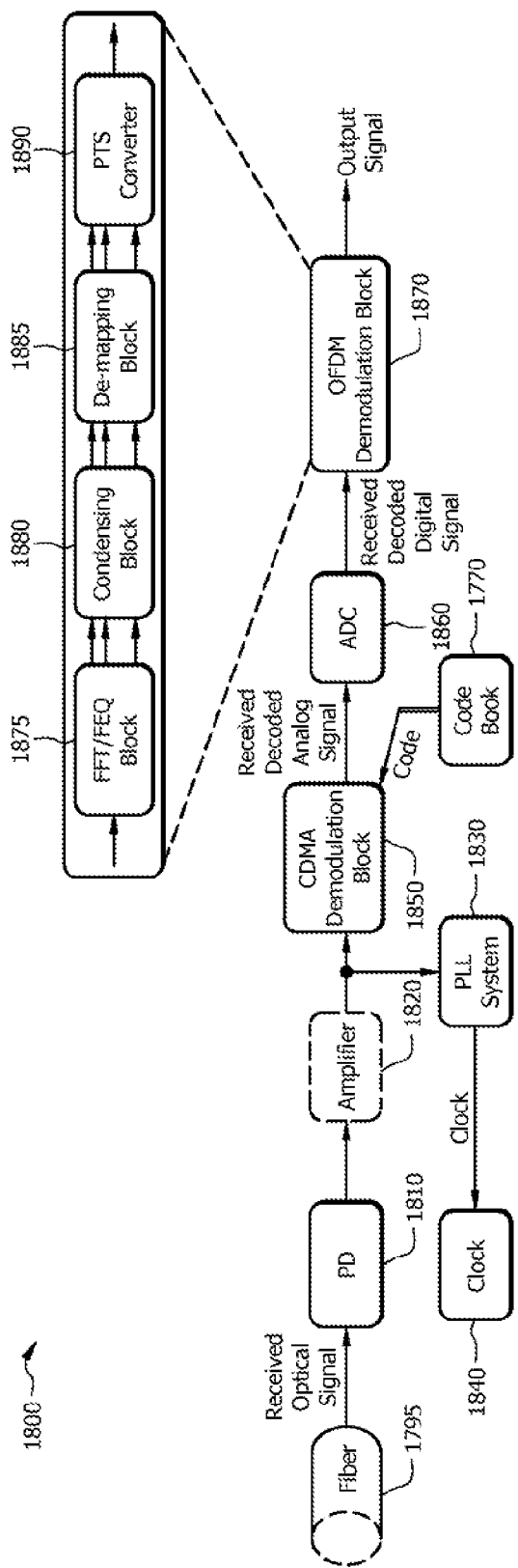
FIG. 18 is a detailed schematic diagram of the receiver of FIG. 16 according to an embodiment of the disclosure.

FIG. 18 is a detailed schematic diagram of the receiver 1620 of FIG. 16 according to an embodiment of the disclosure. The receiver 1620 may comprise a PD 1810, an optional amplifier 1820, a PLL system 1830, a first clock

1840, a CDMA demodulation block 1850, the code book 1770, an ADC 1860, and an OFDM demodulation block 1870. The transmitted optical signal may first arrive from the fiber 1795 as the received optical signal. The PD 1810, the optional amplifier 1820, PLL system 1830, first clock 1840, CDMA demodulation block 1850, and code book 1770 may function similarly to the PD 1210, amplifier 1220, PLL system 1230, first clock 1240, CDMA demodulation block 1250, and code book 940, respectively, of FIG. 12 to produce a received decoded analog signal. If the orthogonal code is of length 32, then the code book 1770 may comprise 32 orthogonal codes, and the frequency of the received decoded analog signal may be 32 times slower than that of the signal that the CDMA demodulation block 1850 receives. The ADC 1860 may convert the received decoded analog signal to a received decoded digital signal.

The OFDM demodulation block 1870 may comprise an FFT/FEQ block 1875, a condensing block 1880, a de-mapping block 1885, and a PTS converter 1890, which may function similarly to the FFT/FEQ block 1470, condensing block 1475, de-mapping block 1480, and PTS converter 1485, respectively, of FIG. 14. The condensing block 1475 may remove the conjugate half of the parallel data block produced from the FFT/FEQ block 1470 so that the parallel data block is halved. Accordingly, the receiver 1620 may produce the output signal.

Figure 19:
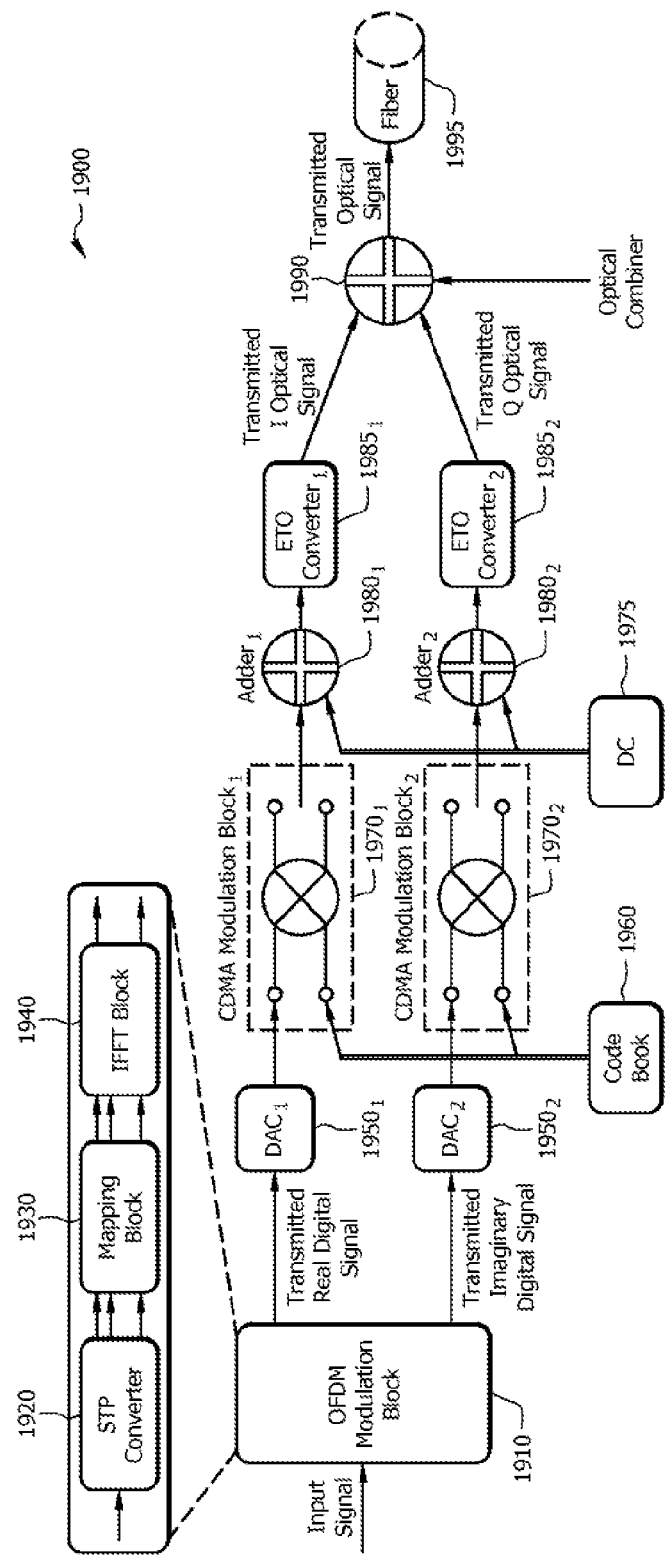
FIG. 19 is another detailed schematic diagram of the transmitter of FIG. 16 employing dual optical polarizations according to another embodiment of the disclosure.

FIG. 19 is another detailed schematic diagram 1900 of the transmitter 1610 of FIG. 16 employing dual optical polarizations according to another embodiment of the disclosure. The transmitter 1610 may comprise an OFDM modulation block 1910, $DACs_{1-n}$ 1950$_{1-2}$, a code book 1960, CDMA modulation blocks$_{1-2}$ 1970$_{1-2}$, a DC system 1975, adders$_{1-2}$ 1980$_{1-2}$, ETO converters$_{1-2}$ 1985$_{1-2}$, and an optical combiner 1990. The OFDM modulation block 1910 may comprise an STP converter 1920, a mapping block 1930, and an IFFT block 1940, which may function similarly to the STP converter 1415, mapping block 1420, and IFFT block 1430, respectively, of FIG. 14. The OFDM modulation block 1910 may not comprise an extension block, so the IFFT block 1940 may generate a transmitted complex digital signal comprising both a transmitted real digital signal and a transmitted imaginary digital signal. The $DAC_1$ 1950$_1$ may convert the transmitted real digital signal to a transmitted real analog signal, and the $DAC_2$ 1950$_2$ may convert the transmitted imaginary digital signal to a transmitted imaginary analog signal.

The CDMA modulation block$_1$ 1970$_1$ may perform a dot multiplication of the transmitted real analog signal and an orthogonal code from the code book 1960 to produce a transmitted real encoded signal as described for FIGS. 9 and 11, and the CDMA modulation block$_2$ 1970$_2$ may perform a dot multiplication of the transmitted imaginary analog signal and an orthogonal code from the code book 1960 to produce a transmitted imaginary encoded signal as described for FIGS. 9 and 11. The two orthogonal codes may be the same. The CDMA modulation block$_1$ 1970$_1$ and the CDMA modulation block$_2$ 1970$_2$ may use the same code. The adder$_1$ 1980$_1$ may add the transmitted real encoded signal with a DC from the DC system 1975 to produce a transmitted real signal, and the adder$_2$ 1980$_2$ may add the transmitted imaginary encoded signal with a DC from the DC system 1975 to produce a transmitted imaginary signal.

The ETO converters$_{1-2}$ 1985$_{1-2}$ may each comprise an ETO converter and an optical polarizer. An optical signal may comprise two orthogonal vector field components, which may be referred to as an I vector and a Q vector. Because the I vector and the Q vector are orthogonal, they may comprise different signals that do not interfere with each other when traveling through the same medium. The ETO converter$_1$ 1985$_1$ may convert the transmitted real signal to a transmitted I optical signal, and the ETO converter$_2$ 1985$_2$ may convert the transmitted imaginary signal to a transmitted Q optical signal. The optical combiner 1990 may combine the transmitted I optical signal and the transmitted Q optical signal to create a transmitted optical signal. Finally, the transmitted optical signal may be transmitted to a fiber or other transmission medium 1995. While FIG. 19 shows the transmitter 1610 processing a single input signal, it should be understood that the transmitter 1610 may process as many input signals as supported by the code book 1960.

Figure 20:
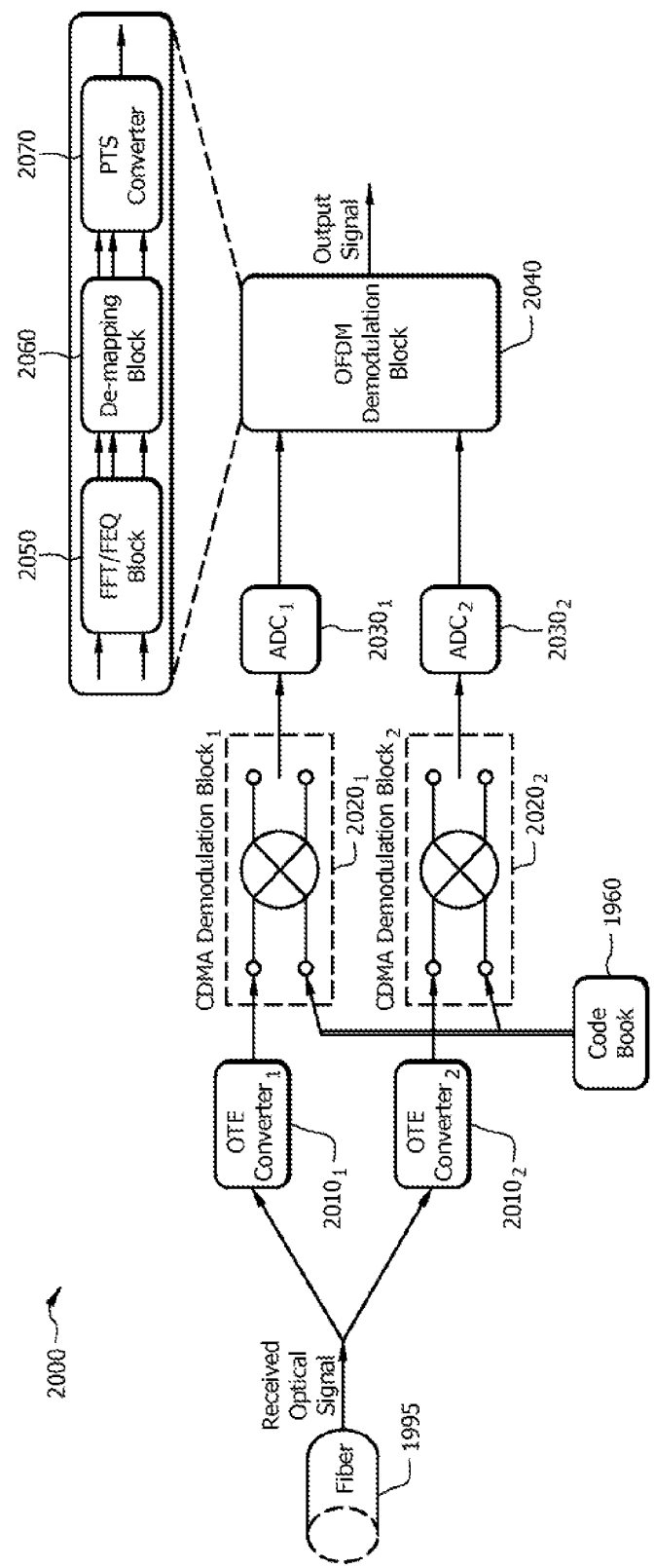
FIG. 20 is another detailed schematic diagram of the receiver of FIG. 16 employing dual optical polarizations according to another embodiment of the disclosure.

FIG. 20 is another detailed schematic diagram of the receiver 1620 of FIG. 16 employing dual optical polarizations according to another embodiment of the disclosure. The receiver 1620 may comprise OTE converters$_{1-2}$ 2010$_{1-2}$, CDMA demodulation blocks$_{1-2}$ 2020$_{1-2}$, the code book 1960, ADCs$_{1-2}$ 2030$_{1-2}$, and an OFDM demodulation block 2040. The transmitted optical signal may first arrive from the fiber 1995 as the received optical signal. The received optical signal may comprise both a received I optical signal and a received Q optical signal. The OTE converter$_1$ 2010$_1$ may convert the received I optical signal to a received real analog signal, and the OTE converter$_2$ 2010$_2$ may convert the received Q optical signal to a received imaginary analog signal. The received I optical signal and the received Q optical signal may have been polarized, rotated, or both at the corresponding transmitter and in the fiber 1995, so the OTE converters$_{1-2}$ 2010$_{1-2}$ may account for that polarization and rotation.

The CDMA demodulation block$_1$ 2020$_1$ may perform a dot multiplication of the received real analog signal and an orthogonal code from the code book 1960 to produce a received real decoded analog signal as described for FIGS. 9 and 11, and the CDMA demodulation block$_2$ 2020$_2$ may perform a dot multiplication of the received imaginary analog signal and an orthogonal code from the code book 1960 to produce a received imaginary decoded analog signal as described for FIGS. 9 and 11. The ADC$_1$ 2030$_1$ may convert the received real decoded analog signal to a received real digital signal, and the ADC$_2$ 2030$_2$ may convert the received imaginary decoded analog signal to a received imaginary digital signal. The OFDM demodulation block 2040 may comprise an FFT/FEQ block 2050, a de-mapping block 2060, and a PTS converter 2070, which may function similarly to the FFT/FEQ block 1470, de-mapping block 1480, and PTS converter 1485, respectively, of FIG. 14. Accordingly, the receiver 1620 may produce the output signal. While FIG. 20 shows the transmitter 1620 processing a single output signal, it should be understood that the transmitter 1620 may process as many output signals as supported by the code book 1960.

Figure 21:
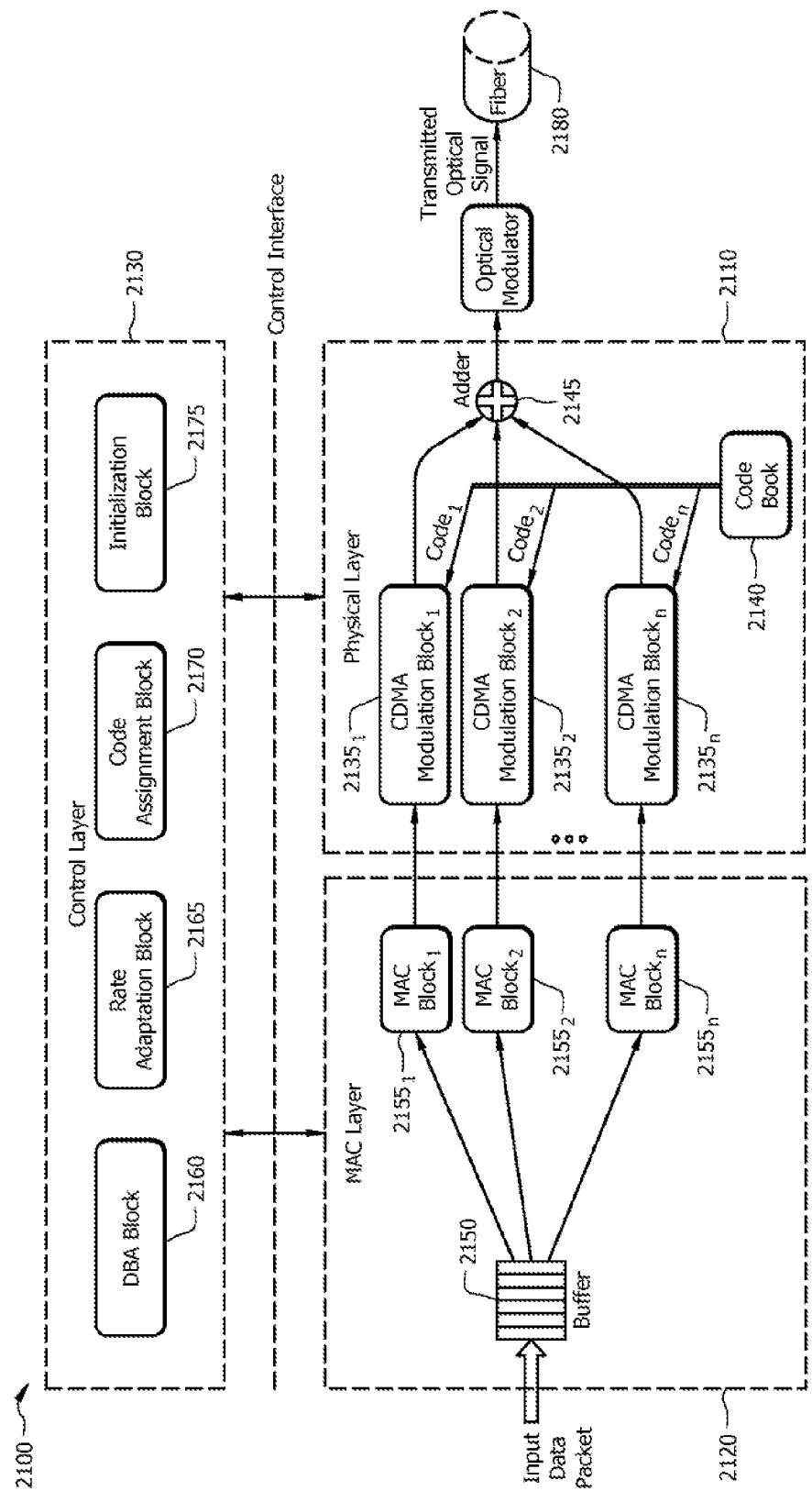
FIG. 21 is a schematic diagram of an optical transmitter employing CDMA according to an embodiment of the disclosure.

FIG. 21 is a schematic diagram of an optical transmitter 2100 employing CDMA according to an embodiment of the disclosure. The transmitter 2100 may generally comprise a physical layer 2110, a MAC layer 2120, and a control layer 2130. The physical layer 2110 and the MAC layer 2120 may be the primary layers for transmitting data to the fiber or other transmission medium 2180. The control layer 2130 may be flexibly managed to ensure that the physical layer 2110 and the MAC layer 2120 function according to specifications, for example, the specifications described below.

The physical layer 2110 may comprise CDMA modulation blocks$_{1-n}$ 2135$_{1-n}$, a code book 2140, and an adder 2145, which may function as described above. The MAC layer 2120 may comprise a buffer 2150 and MAC blocks$_{1-n}$ 2155$_{1-n}$, which may provide framing, forward error correction (FEC), 64/65 coding, and other functions for the input data packet. The control layer 2130 may comprise a dynamic bandwidth allocation (DBA) block 2160, a rate adaptation block 2165, a code assignment block 2170, and an initialization block 2175, which are described more fully below.

Figure 22:
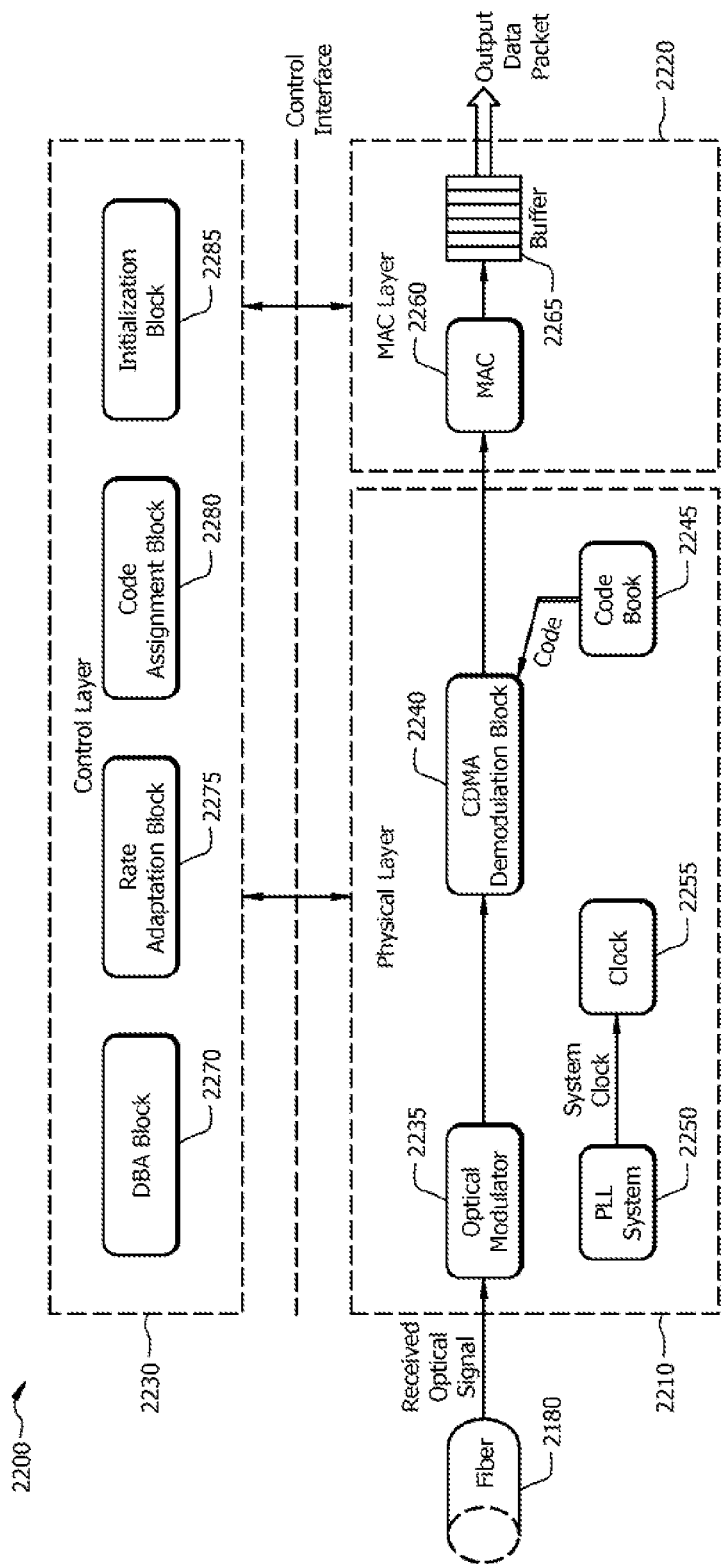
FIG. 22 is a schematic diagram of an optical receiver corresponding to the optical transmitter of FIG. 21 according to an embodiment of the disclosure.

FIG. 22 is a schematic diagram of an optical receiver 2200 corresponding to the optical transmitter 2100 of FIG. 21 according to an embodiment of the disclosure. The receiver 2200 may generally comprise a physical layer 2210, a MAC layer 2220, and a control layer 2230. The physical layer 2210 and the MAC layer 2220 may be the primary layers for receiving data from the fiber 2180. The control layer 2230 may be flexibly managed to ensure that the physical layer 2210 and the MAC layer 2220 function according to specifications, for example, the specifications described below.

The physical layer 2210 may comprise an optical modulator 2235, a CDMA demodulation block 2240, a code book 2245, a PLL system 2250, and a clock 2255, which may function as described above. The MAC layer 2220 may comprise a MAC block 2260 and a buffer 2265, which may provide framing, FEC, 64/65 coding, and other functions for the output data packet. The control layer 2230 may comprise a DBA block 2270, a rate adaptation block 2275, a code assignment block 2280, and an initialization block 2285, which are described more fully below.

As an example, the transmitter 2100 may be the transmitter 180 or the transmitting portion of the transceiver 105 of the OLT 110, and the receiver 220 may be the receiver 170 or the receiving portion of the transceiver 105 of the OLT 110. A PON employing the transmitter 2100 and the receiver 220 may be the PON 100. The PON 100 may have associated with it ONUs, which may be the ONUs 120. The PON 100 may transmit at a downstream wavelength of 1310 nanometers (nm) and transmit at an upstream wavelength of 1490 nm. The downstream chip rate may be 2.5 GHz. A Walsh orthogonal code may be of length 32, so the code may comprise 32 orthogonal codes, there may be 32 downstream code paths, and the system may support 32 users. The sample rate for each path may be 2.5 GHz/32, or 78.125 MHz. The maximum analog data format may be PAM-16, which may allow for four bits in each sample. The PAM order may be adjusted according to the power budget of the receiver 2200, which may be determined based on noise, transmit power, and other factors. Some users may be associated with ONUs 120 that may comprise more than one correlator, thus allowing more than one orthogonal code, and some users may be associated with ONUs 120 that support higher-order PAM systems; thus, the ONUs 120 may allow for varying throughput. The transmit power of each CDMA modulated signal may be dynamically adjusted, under a total average transmit power constraint, to increase the data rate for a particular ONU 120. The transmitter 2100 may support all of the above maximum specifications.

The upstream chip rate may also be 2.5 GHz. A Walsh orthogonal code may be of length 4, so the code may comprise 4 orthogonal codes, and there may be 4 upstream code paths. The sample rate for each path may be 2.5 GHz/4, or 625 MHz. The maximum analog data format may be PAM-16, which may allow for four bits in each sample. The PAM order may be adjusted as described above. As described above, some ONUs 120 may allow for more than one orthogonal code, and some ONUs 120 may support higher-order PAM systems. The receiver 2200 may support all of the above maximum specifications.

Figure 23:
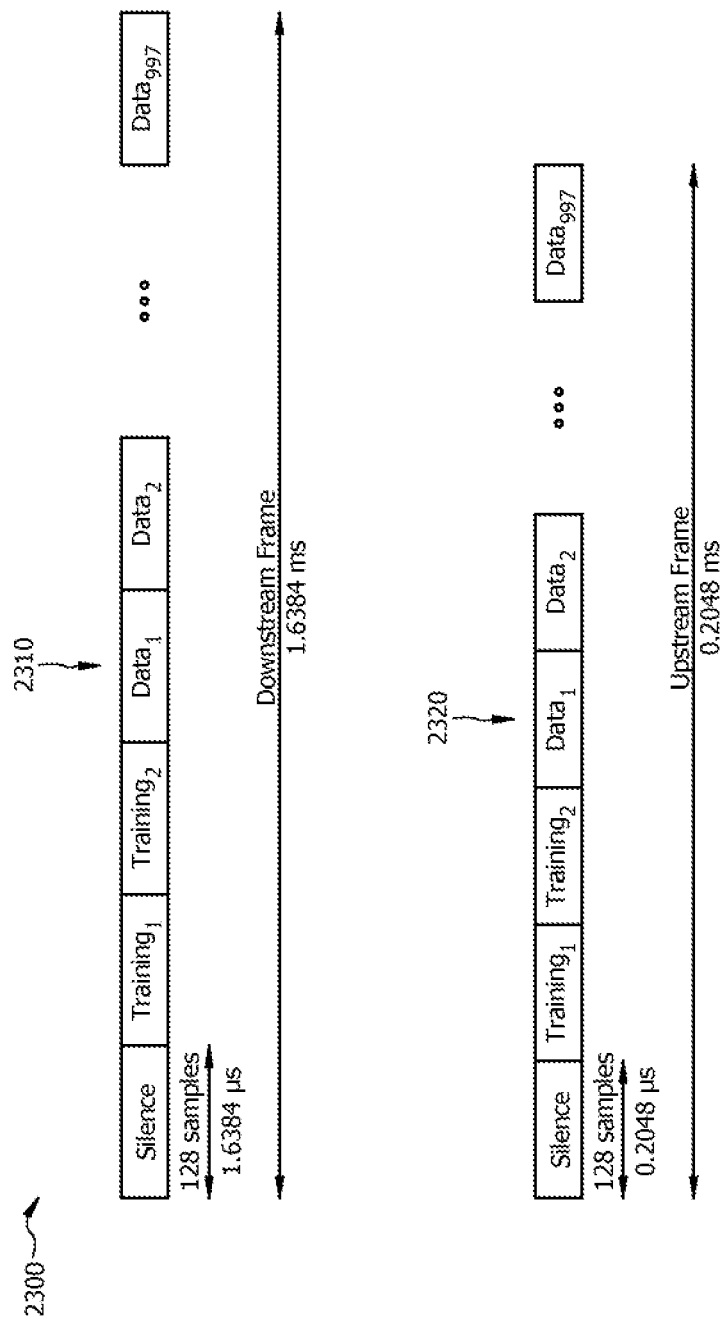
FIG. 23 is a diagram of a physical layer frame for use in a PON employing CDMA.

FIG. 23 is a diagram of a physical layer frame 2300 for use in a PON employing CDMA. The PON employing CDMA may be the PON 100. The initialization block 2175 and the initialization block 2285 may provide for an ONU 120 to connect to the PON 100 and prepare for data. To complete initialization, the frame 2300 may be used. The data in the frame 2300 may be exchanged frame by frame as shown. Each frame 2300 may comprise a downstream frame 2310 and an upstream frame 2320. Both the downstream frame 2310 and the upstream frame 2320 may comprise 1,000 blocks, including a silence block, two training blocks, and 997 data blocks. In the downstream frame 2310, each block may comprise 128 samples of code. Because the sample rate may be 78.125 MHz, the duration of each block may be 128/78.125 MHz, or 1.6384 microseconds (μs). Because the downstream frame 2310 may comprise 1,000 blocks, the duration of the downstream frame 2310 may be 1.6384 μs×1,000, or 1.6384 milliseconds (ms). In the upstream frame 2320, each block may comprise 128 samples of code. Because the sample rate may be 625 MHz, the duration of each block may be 128/625 MHz, or 0.2048 μs. Because the upstream frame 2320 may comprise 1,000 blocks, the duration of the upstream frame 2320 may be 0.2048 μs×1,000, or 0.2048 ms.

During the silence block, the transmitter 2100 and other transmitters (not shown) in the PON may be silent, so no optical signal may be on the fiber 2180. The two training blocks may provide for an ONU 120 to prepare for data after powering up, including by notifying the ONU 120 of any modulation schemes. The 997 data blocks may comprise a payload of the desired data. When the ONU 120 powers on, it may listen for a signal. During that time, the PLL system 2250 may help the ONU 120 synchronize the clock 2255 to a clock (not shown) associated with the signal. Then the ONU 120 may search for the silence block to find the beginning of the frame 2300. In the first training block, the signal may be modulated by employing PAM-2 and a single orthogonal code known by all ONUs 120. When the ONU 120 finds the frame 2300, the ONU 120 may perform orthogonal code alignment. A voltage control phase shifter (not shown) may be helpful for that alignment. During the alignment, the ONU 120 may continuously correlate the signal using the single orthogonal code and check the value of each correlation. The alignment may be completed when the maximum output value results. After alignment completes, the ONU 120 may demodulate the information in the first training block. The first training block may comprise an indicator to indicate to the ONU 120 an appropriate time to transmit a registration frame.

The ONU 120 may then transmit the registration frame to the OLT 110. The registration frame may be designed similarly to the frame 2300, but all the data may be modulated by employing PAM-2 and the single orthogonal code. The first training block and the last two data blocks may be silent to avoid optical signal interference on the fiber 2180. The registration frame may comprise specifications of the ONU 120, an identification (ID) associated with the ONU 120, and other information.

The OLT 110 may receive the registration frame at a predefined time slot. The receiver 2200 at the OLT 110 may first perform CDMA code alignment and may then perform demodulation of the data in the registration frame. If the OLT 110 receives data it is seeking, then the transmitter 2100 at the OLT 110 may send a confirmation frame to the ONU 120 to inform the ONU 120 that initialization is complete. If the OLT 110 does not receive the data it is seeking, then the transmitter 2100 at the OLT 110 may not send the confirmation frame to the ONU 120, so the ONU 120 may again attempt initialization.

The DBA block 2160 and the DBA block 2270 may allocate to different users associated with the ONUs 120 time slots for upstream transmission. DBA messages may be exchanged in an embedded channel in both the downstream and upstream paths. The minimum transmission unit for upstream transmission may be one frame 2300, so the shortest scheduling time may be 0.2048 ms. The DBA messages may include apply and ack, or acknowledgement, messages. The apply message may be for the ONU 120 to apply for a time slot to transmit data to the OLT 110. The apply message may comprise an ID and data length. The OLT 110 may comprise a table indicating the priority of the ONUs 120 by ID. The ack message may be for the OLT 110 to indicate to the ONU 120 which time slots the ONU 120 may transmit on. The ack message may comprise a time slot index and an orthogonal code index for CDMA modulation.

The code assignment block 2170 and the code assignment block 2280 may assign the orthogonal code to the ONU 120. The assignment may be included in a downstream training block in the embedded channel. As described above, the PON 100 may support 32 users, which may be associated with the ONUs 120, though some ONUs 120 may support more than one orthogonal code and thus more than one CDMA demodulation. Static orthogonal code allocation may not be feasible. For example, if an orthogonal code is allocated to an ONU 120 that is not communicating, then that orthogonal code may be reallocated to an ONU 120 that is busier and may benefit from an additional orthogonal code. The code assignment block 2170 may analyze the buffer 2150 to determine which ONUs 120 should receive data and to determine the priorities of those ONUs 120. Then code assignment block 2170 may then generate a control message based on those determinations and based on the decoding ability of each ONU 120. The OLT 110 may then send the control message to the ONUs 120 to indicate which ONUs 120 will receive data in the next frame 2300. For each ONU 120 to receive data, the control message may also comprise an orthogonal code. The orthogonal code allocations may be preserved for all succeeding frames 2300 until a new control message reallocates the orthogonal codes. There may be two types of control messages. In that case, a start control message may be transmitted in a training block and used to allocate orthogonal codes. If the ONU 120 receives a start control message, then the ONU 120 may demodulate the data belonging to it and go into a sleep mode to save power. A stop control message may be transmitted in the embedded channel and used to tell the ONU 120 to stop using the allocated orthogonal code.

The rate adaptation block 2165 and the rate adaptation block 2275 may indicate the PAM order to the ONU 120. The receiver 2100 in the OLT 110 and the receiver 2100 in the ONU 120 may monitor the SNR of their received signals. When the OLT 110 determines that the SNR of its received signal is 3 decibel (dB) less than the target SNR or when the OLT 110 receives a report from the ONU 120, via a special embedded channel defined for the report, that the ONU's 120 received signal is 3 dB less than the target SNR, the OLT 110 may determine whether or not to adapt the PAM order. For example, the OLT 110 may determine to add a bit to the PAM order. The OLT 110 may then transmit to the ONU 120 experiencing the increased SNR a frame indicating the adapted PAM order. The ONU 120 may then transmit to the OLT 110 an ack indicating that the ONU 120 will increase its loading bits. At an indicated frame, the OLT 110 and the ONU 120 will then adapt to the new PAM order. Alternatively, the PAM order may reduce if the reported SNR does not allow for a target BER.

Figure 24:
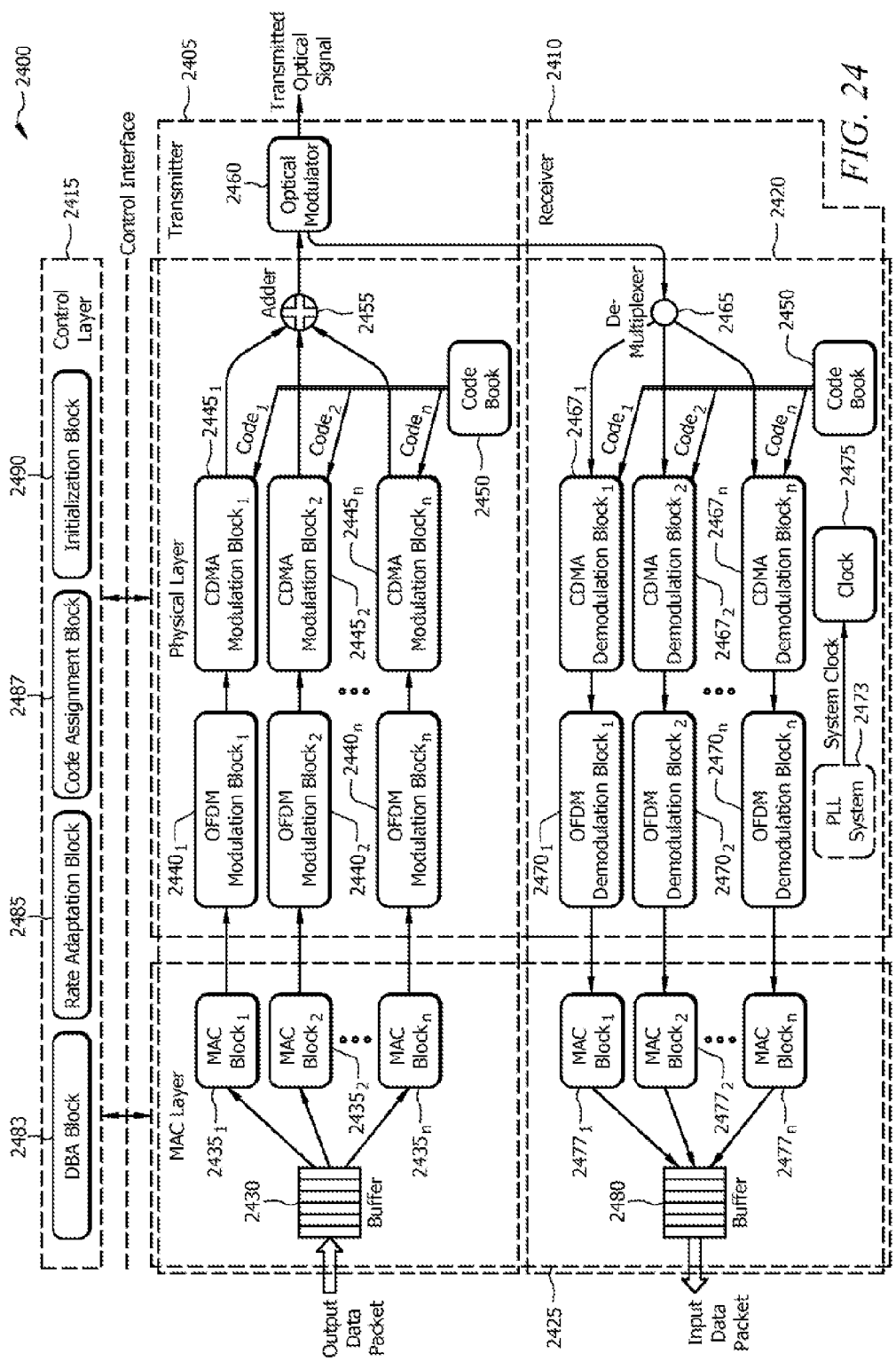
FIG. 24 is a schematic diagram of an optical transceiver employing OFDM and CDMA according to an embodiment of the disclosure.

FIG. 24 is a schematic diagram of an optical transceiver 2400 employing OFDM and CDMA according to an embodiment of the disclosure. The transceiver 2400 may generally comprise a transmitter 2405, a receiver 2410, and a control layer 2415. The transceiver 2400 may further generally comprise a physical layer 2420 and a MAC layer 2425, each of which may comprise portions of the transmitter 2405 and the receiver 2410 as shown. The transmitter 2405 may comprise a buffer 2430, MAC blocks$_{1-n}$ 2435$_{1-n}$, OFDM modulation blocks$_{1-n}$ 2440$_{1-n}$, CDMA modulation blocks$_{1-n}$ 2445$_{1-n}$, a code book 2450, an adder 2455, and an optical modulator 2460, which may function as described above. The receiver 2410 may comprise a de-multiplexer 2465, CDMA demodulation blocks$_{1-n}$ 2467$_{1-n}$, the code book 2450, OFDM demodulation blocks$_{1-n}$ 2470$_{1-n}$, a PLL system 2473, a clock 2475, MAC blocks$_{1-n}$ 2477$_{1-n}$, and a buffer 2480, which may function as described above. The control layer 2415 may comprise a DBA block 2483, a rate adaptation block 2485, a code assignment block 2487, and an initialization block 2490, which may function as described above.

As an example, the transceiver 2400 may be the transceiver 105 of the OLT 110 or the combination of the receiver 170 and the transmitter 180 of the ONU 120. If the transceiver 2400 is the transceiver 105 of the OLT 110, then the PLL system 2473 and clock 2475 may not be necessary as the OLT 110 may be the source of the clock 2475. A PON employing the transceiver 2400 may be the PON 100. The transmitter 2405 may transmit at a wavelength of 1310 nm, and the receiver 2410 may receive at a wavelength of 1490 nm. A downstream chip rate may be 2.5 GHz. A Walsh orthogonal code may be of length 32, so the code may comprise 32 orthogonal codes, there may be 32 downstream code paths, and the system may support 32 users. The sample rate for each path may be 2.5 GHz/32, or 78.125 MHz. The maximum OFDM modulation order may be QAM-1024, which may allow for 10 bits in each subcarrier. The QAM order may be adjusted according to the power budget of the receiver 2410, which may be determined based on noise, transmit power, and other factors. Some users may be associated with ONUs 120 that may comprise more than one correlator, thus allowing more than one orthogonal code, and some users may be associated with ONUs 120 that support higher-order QAM systems; thus, the ONUs 120 may allow for varying throughput. The transmit power of each CDMA modulated signal may be dynamically adjusted, under a total average transmit power constraint, to increase the data rate for a particular ONU 120. The transmitter 2405 may support all of the above maximum specifications.

An upstream chip rate may also be 2.5 GHz. A Walsh orthogonal code may be of length four, so the code may comprise four orthogonal codes, and there may be four upstream code paths. The sample rate for each path may be 2.5 GHz/4, or 625 MHz. The maximum OFDM modulation order may be QAM-1024, which may allow for 10 bits in each subcarrier. The QAM order may be adjusted as described above. As described above, some ONUs 120 may allow for more than one orthogonal code, and some ONUs 120 may support higher-order QAM systems. The receiver 2410 may support all of the above maximum specifications.

The transceiver 2400 may send and receive frames like the frame 2300, except the 128-sample blocks may be replaced with 128-sample OFDM symbols. The length of the OFDM symbols may be any other length such as 64 samples or longer. Using 128-sample OFDM symbols, the subcarrier number may be 128 if the transceiver 2400 employs dual polarizations, or the subcarrier number may be 64 if the transceiver 2400 employs only one polarization. The training bits may use quadrature phase-shift keying (QPSK), which may also be known as 4-QAM.

Figure 25:
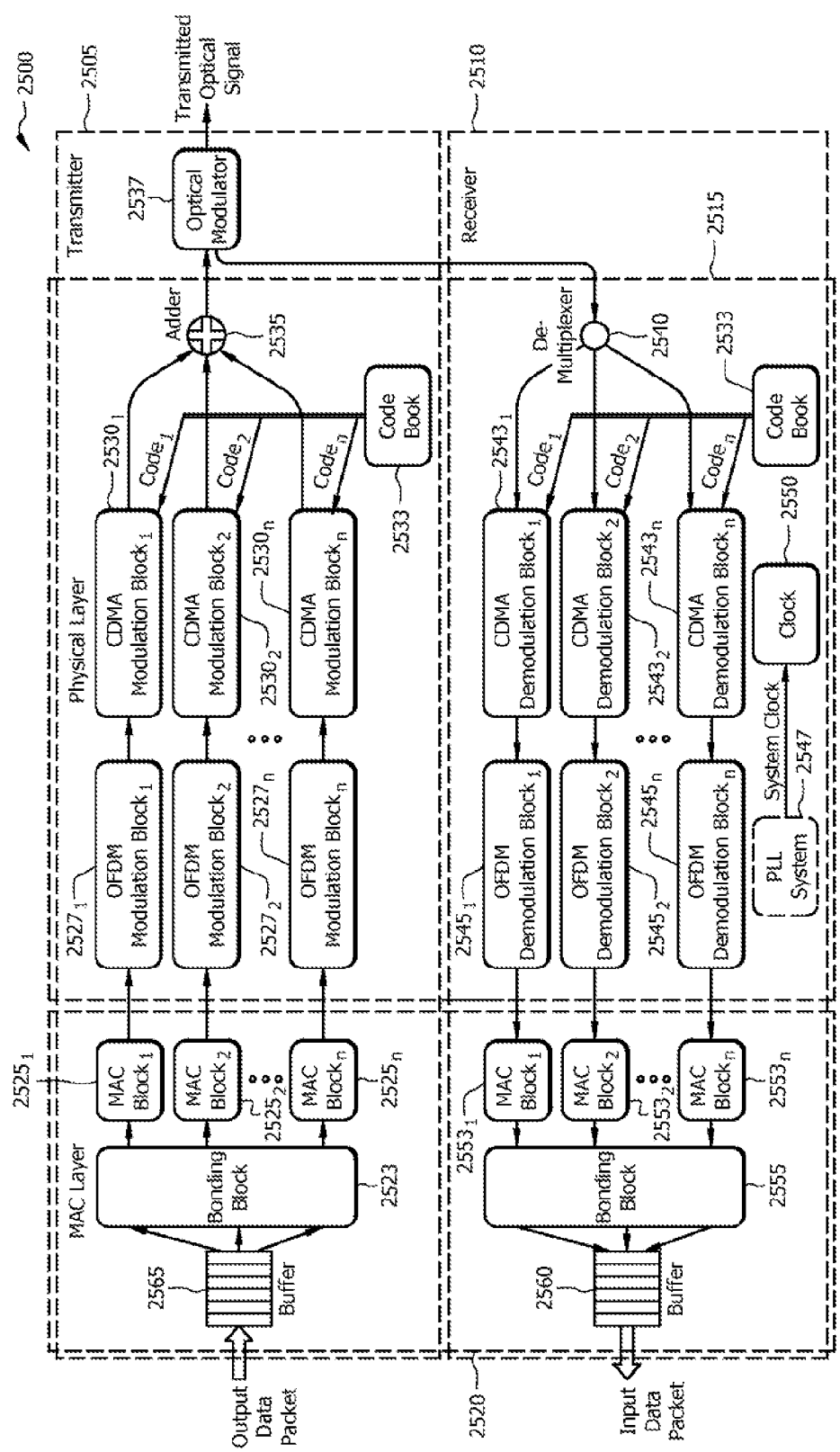
FIG. 25 is a schematic diagram of a transceiver employing OFDM and CDMA in a short-distance system according to an embodiment of the disclosure.

FIG. 25 is a schematic diagram of a transceiver 2500 employing OFDM and CDMA in a short-distance system according to an embodiment of the disclosure. The transceiver 2500 may generally comprise a transmitter 2505 and a receiver 2510. The transceiver 2500 may further generally comprise a physical layer 2515 and a MAC layer 2520, each of which may comprise portions of the transmitter 2505 and the receiver 2510 as shown. The transmitter 2505 may comprise a buffer 2565, MAC blocks$_{1-n}$ 2525$_{1-n}$, OFDM modulation blocks$_{1-n}$ 2527$_{1-n}$, CDMA modulation blocks$_{1-n}$ 2530$_{1-n}$, a code book 2533, an adder 2535, and an optical modulator 2537, which may function as described above. The receiver 2510 may comprise a de-multiplexer 2540, CDMA demodulation blocks$_{1-n}$ 2543$_{1-n}$, the code book 2533, OFDM demodulation blocks$_{1-n}$ 2545$_{1-n}$, a PLL system 2547, a clock 2550, MAC blocks$_{1-n}$ 2553$_{1-n}$, and a buffer 2560 which may function as described above. The transmitter 2505 may further comprise a bonding block 2523, and the receiver 2510 may also further comprise a bonding block 2555. The bonding block 2523 and the bonding block 2555 may be any systems suitable for performing bonding functions as known by one of ordinary skill in the art.

The transceiver 2500 may be used in a point-to-point system, as opposed to a point-to-multipoint system such as the PON 100. The architecture may be simpler because there may not be any control function required to schedule and prioritize traffic for different ONUs. Short-distance systems may comprise loop lengths of approximately 2 km, and there may not be a splitter between two transceivers. A chip rate may be 10 GHz in both the upstream and the downstream directions; the sampling rate may be 10 GHz/32, or 312.5 MHz; 32 orthogonal codes of length 32 may be used in both the upstream and the downstream directions; and two polarizations may be used for transmission.

Figure 26:
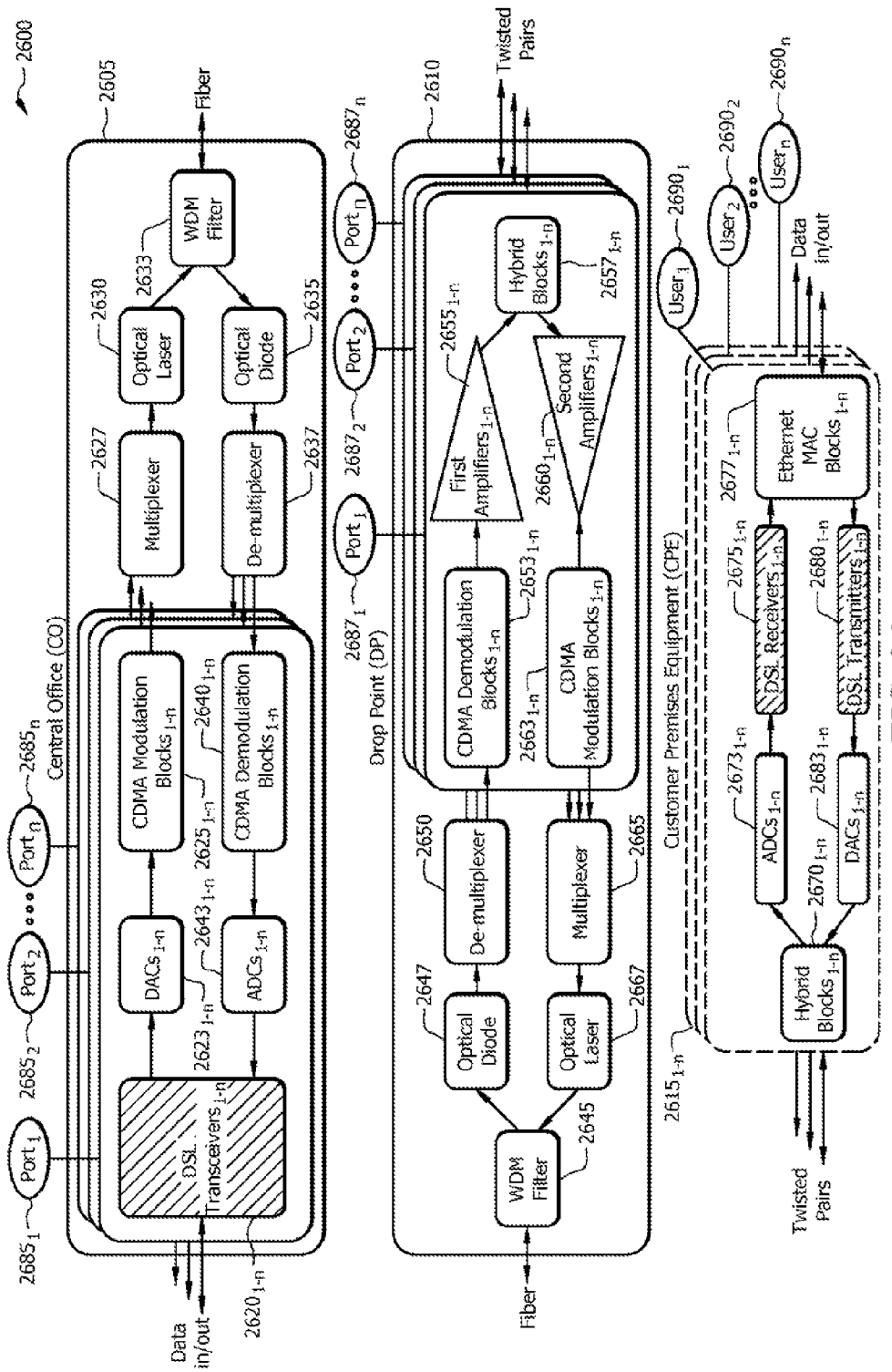
FIG. 26 is a schematic diagram of a PON system employing (digital subscriber line) DSL according to an embodiment of the disclosure.

FIG. 26 is a schematic diagram of a PON system 2600 employing DSL according to an embodiment of the disclosure. The system 2600 may comprise a CO 2605, a drop point (DP) 2610, and customer premises equipments$_{1-n}$ (CPEs) 2615$_{1-n}$. The CO 2605 may comprise DSL transceivers$_{1-n}$ 2620$_{1-n}$ DACs$_{1-n}$ 2623$_{1-n}$, CDMA modulation blocks$_{1-n}$ 2625$_{1-n}$, a multiplexer 2627, an optical laser 2630, a WDM filter 2633, an optical diode 2635, a de-multiplexer 2637, CDMA demodulation blocks$_{1-n}$ 2640$_{1-n}$ ADCs$_{1-n}$ 2643$_{1-n}$ and ports$_{1-n}$ 2685$_{1-n}$, which may function as described above or as otherwise known by one of ordinary skill in the art. The DP 2610 may comprise a WDM filter 2645, an optical diode 2647, a de-multiplexer 2650, CDMA demodulation blocks$_{1-n}$ 2653$_{1-n}$, first amplifiers$_{1-n}$ 2655$_{1-n}$, second amplifiers$_{1-n}$ 2660$_{1-n}$, CDMA demodulation blocks$_{1-n}$ 2663$_{1-n}$, a multiplexer 2665, an optical laser 2667, and ports$_{1-n}$ 2687$_{1-n}$, which may function as described above or as otherwise known by one of ordinary skill in the art. The DP 2610 may further comprise hybrid blocks$_{1-n}$ 2657$_{1-n}$, which may provide a physical conversion from the two wires of the twisted pairs to four wires that may exist on a chip associated with the DP 2610. The CPEs$_{1-n}$ 2615$_{1-n}$ may comprise hybrid blocks$_{1-n}$ 2670$_{1-n}$, ADCs$_{1-n}$ 2673$_{1-n}$, DSL receivers$_{1-n}$ 2675$_{1-n}$, Ethernet MAC blocks$_{1-n}$ 2677$_{1-n}$, DSL transmitters$_{1-n}$ 2680$_{1-n}$, and DACs$_{1-n}$ 2683$_{1-n}$, which may function as described above or as otherwise known by one of ordinary skill in the art. The CPEs$_{1-n}$ 2615$_{1-n}$ may be associated with users$_{1-n}$ 2690$_{1-n}$.

Compared to a conventional FTTx+DSL system, the DSL transceivers$_{1-n}$ 2620$_{1-n}$ may be in the CO 2605 instead of the DP 2610. This may simplify the DP 2610 and provide for less volume, power consumption, thermal emissions, etc. for the DP 2610. The CPE 2615 may be a conventional CPE. In addition, the number of DSL transceivers$_{1-n}$ 2620$_{1-n}$ in the CO 2605 may be less than the number of users$_{1-n}$ 2690$_{1-n}$ because not all CPEs$_{1-n}$ 2615$_{1-n}$ may transmit and receive data at the same time, so the system 2600 may appreciate a statistical multiplex. In other words, there may be less than n DSL transceivers 2620. For example, if the system 2600 employs very-high-bit-rate digital subscriber line 2 (VDSL2) with a 30a profile, and if the optical laser 2630 and the optical laser 2667 are 10 GHz lasers, then the fiber may be able to provide 10 GHz/30 MHz, or 333 services. The orthogonal code length may be the maximum number that is an integer exponent of two, yet less than 333, which yields an orthogonal code length of 256. In that case, the system 2600 may provide access to 256 users 2690, and each user 2690 may appreciate a 100 megabits per second (Mbps) symmetric data rate in both the downstream and the upstream directions.

Current FTTdp equipment may provide access to only 48 users at a time. In that case, a splitter may be inserted in the fiber between the CO 2605 and the DP 2610 so that a single port in the CO 2605 may service multiple DPs 2610. The splitting ratio may be limited to 1:4 as every split may result in an optical SNR decrease of 3 dB or more.

The system 2600 may be implemented in at least two ways. First, the same static orthogonal code mapping table may be stored in both the CO 2605 and the DP 2610. Each CPE 2615 may be assigned to a port$_{1-n}$ 2685$_{1-n}$ in the CO 2605 and a port$_{1-n}$ 2687$_{1-n}$ in the DP 2610. For example, user$_1$ 2690$_1$ and his associated CPE$_1$ 2615$_1$ may be assigned port$_1$ 2685$_1$ in the CO 2605 and port$_1$ 2687$_1$ in the DP 2610. Port$_1$ 2687$_1$ in the DP 2610 may connect to port$_1$ 2685$_1$ in the CO 2605 only when they use the same orthogonal code for CDMA modulation and demodulation. When that occurs, the channel between the CO 2605 and the CPE$_1$ 2615$_1$ may be established. To exchange the mapping table, an orthogonal code may be assigned to the DP 2610 to establish a dedicated channel between the CO 2605 and the DP 2610 for purposes of exchanging the mapping table when the DP 2610 powers on.

Second, a dynamic orthogonal code mapping table may be used. This may maximize resources if, for example, the CPE$_2$ 2615$_2$ powers off. In that case, the orthogonal code corresponding to CPE$_2$ 2615$_2$ may be assigned to another CPE$_{1-n}$ 2615$_{1-n}$. To achieve this dynamism, the CPE$_2$ 2615$_2$ may not receive an orthogonal code until it requests one. To do so, when the CPE$_2$ 2615$_2$ powers on, it may send a handshake to the DP 2610 according to the ITU Telecommunication Standardization Sector (ITU-T) standards governing DSL, including ITU-T G.991.1-G.999.1, which are incorporated by reference. In response, the DP 2610 may send to the CO 2605 an orthogonal code application message including port information via the dedicated channel described above. The CO 2605 may then allocate an orthogonal code to port$_2$ 2685$_2$ of the CO 2605 corresponding to the CPE$_2$ 2615$_2$ and transmit to the DP 2610 an answer message that identifies the orthogonal code and port$_2$ 2685$_2$ of the CO 2605. In addition, the CO 2605 may update its mapping table with the new allocation. Upon receiving the answer message, the DP 2610 may update its port assignment and mapping table. Finally, when the DP 2610 receives signals from the CPE$_2$ 2615$_2$, it may modulate those signals with the assigned orthogonal code and transmit those signals to the CO 2605. Likewise, when the DP 2610 receives signals from the CO 2605 corresponding to the $CPE_2$ $2615_2$, the DP 2610 may demodulate those signals with the assigned orthogonal code and transmit those signals to the $CPE_2$ $2615_2$.

Figure 27:
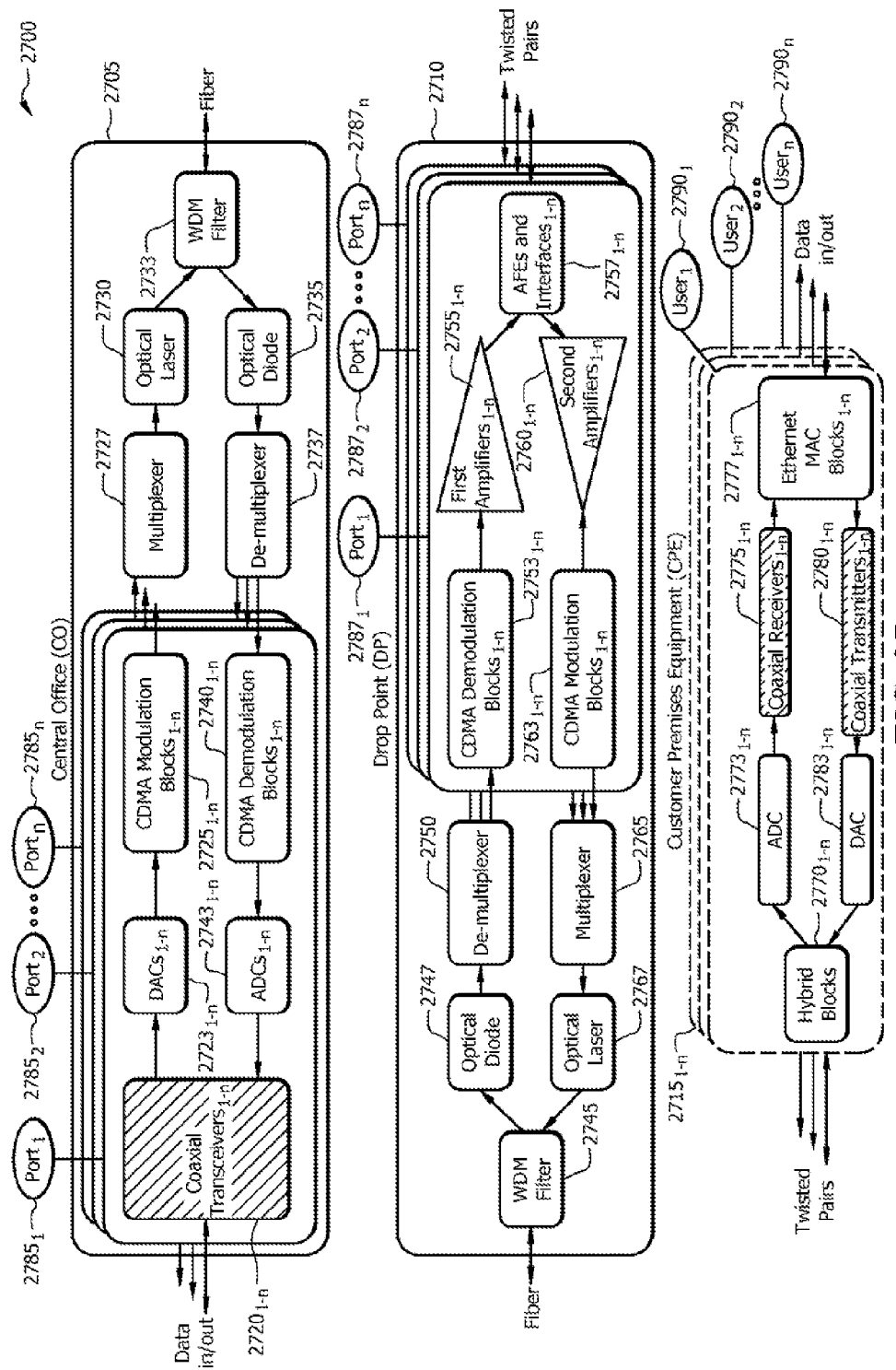
FIG. 27 is a schematic diagram of a PON system employing coaxial cable according to an embodiment of the disclosure.

FIG. 27 is a schematic diagram of a PON system 2700 employing coaxial cable according to an embodiment of the disclosure. While FIG. 26 may employ DSL, other media may be used in place of DSL while maintaining the basic architecture of FIG. 26. Returning to FIG. 27, coaxial cable may be used in place of DSL. The system 2700 may comprise a CO 2705, a DP 2710, and user equipments $(UEs)_{1-n}$ $2715_{1-n}$. The CO 2705 may comprise coaxial transceivers$_{1-n}$ $2720_{1-n}$, $DACs_{1-n}$ $2723_{1-n}$, CDMA modulation blocks$_{1-n}$ $2725_{1-n}$, a multiplexer 2727, an optical laser 2730, a WDM filter 2733, an optical diode 2735, a de-multiplexer 2737, CDMA demodulation blocks$_{1-n}$ $2740_{1-n}$, $ADCs_{1-n}$ $2743_{1-n}$, and ports$_{1-n}$ $2785_{1-n}$, which may function as described above or as otherwise known by one of ordinary skill in the art. The coaxial transceivers$_{1-n}$ $2720_{1-n}$ may use Data Over Cable Service Interface Specification (DOCSIS), which is incorporated by reference. The DP 2710 may comprise a WDM filter 2745, an optical diode 2747, a de-multiplexer 2750, CDMA demodulation blocks$_{1-n}$ $2753_{1-n}$, first amplifiers$_{1-n}$ $2755_{1-n}$, second amplifiers$_{1-n}$ $2760_{1-n}$, CDMA demodulation blocks$_{1-n}$ $2763_{1-n}$, a multiplexer 2765, an optical laser 2767, and ports$_{1-n}$ $2787_{1-n}$, which may function as described above or as otherwise known by one of ordinary skill in the art. The DP 2710 may further comprise AFEs and interfaces$_{1-n}$ $2757_{1-n}$, which may function similarly to the hybrid blocks$_{1-n}$ $2657_{1-n}$, but for a coaxial system instead of a DSL system. The $UEs_{1-n}$ $2715_{1-n}$ may comprise AFEs and interfaces$_{1-n}$ $2770_{1-n}$, $ADCs_{1-n}$ $2773_{1-n}$, coaxial receivers$_{1-n}$ $2775_{1-n}$, Ethernet MAC blocks$_{1-n}$ $2777_{1-n}$, coaxial transmitters$_{1-n}$ $2780_{1-n}$, and $DACs_{1-n}$ $2783_{1-n}$, which may function as described above or as otherwise known by one of ordinary skill in the art. The $UEs_{1-n}$ $2715_{1-n}$ may be associated with users$_{1-n}$ $2790_{1-n}$. The coaxial receivers$_{1-n}$ $2775_{1-n}$ may be DOCSIS receivers, and the coaxial transmitters$_{1-n}$ $2780_{1-n}$ may be DOCSIS transmitters. Instead of DOCSIS, the transceivers$_{1-n}$ $2720_{1-n}$, coaxial receivers$_{1-n}$ $2775_{1-n}$, and coaxial transmitters$_{1-n}$ $2780_{1-n}$ may employ any other specification.

Initialization and orthogonal code allocation may occur as described above. The orthogonal code length may be based on the bandwidth, $B_C$, of the coaxial communication signal and the bandwidth, $B_O$, of the optical signal by dividing $B_O$ by $B_C$ and rounding down to the nearest integer. If using a Walsh orthogonal code length, the orthogonal code length may be the maximum number that is an integer exponent of two, yet less than $B_O$ divided by $B_C$. The connected media may be in any combination. For example, $UE_1$ $2715_1$ may be associated with DSL, $UE_5$ $2715_5$ may be associated with coaxial, and $UE_{20}$ $2715_{20}$ may be associated with a wireless technology such as Wi-Fi, which is incorporated by reference. In that case, $B_C$ may be the largest bandwidth among all the different media.

Figure 28:
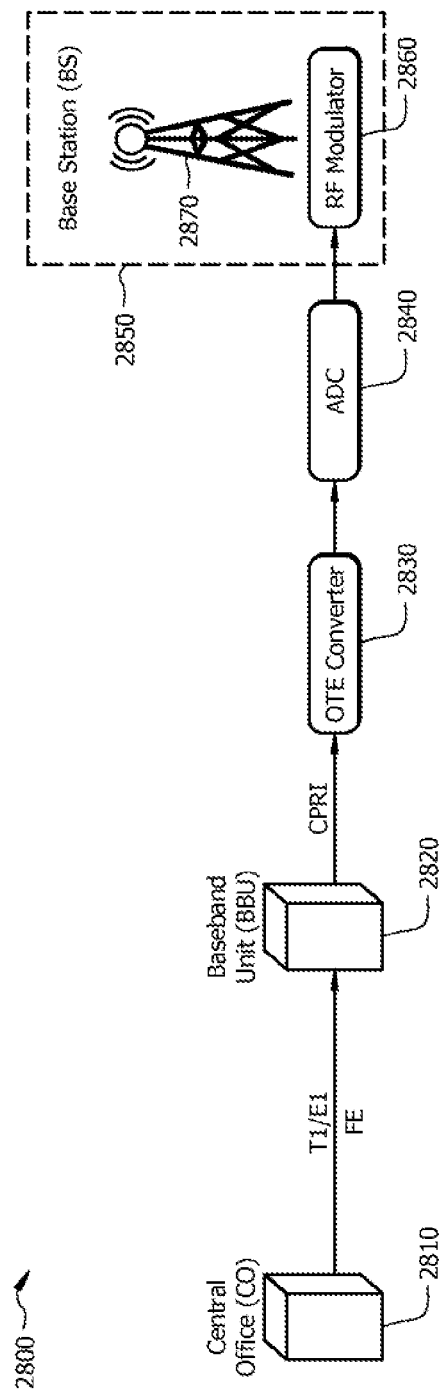
FIG. 28 is a schematic diagram of a wireless network.

FIG. 28 is a schematic diagram of a wireless network 2800. The network 2800 may comprise a CO 2810, a baseband unit (BBU) 2820, an OTE converter 2830, an ADC 2840, and a base station (BS) 2850, which may function as described above or as otherwise known by one of ordinary skill in the art. The BS 2850 may comprise a radio frequency (RF) modulator 2860 and a tower 2870, which may function as described above or as otherwise known by one of ordinary skill in the art.

Long Term Evolution (LTE) has been introduced to improve wireless network data rates, but LTE may have smaller coverage compared to previous wireless technologies. The smaller coverage may require that the BS 2850 be closer to the user and may require a less costly backhaul solution to provide a connection between the CO 2810 and the BS 2850. For lower operation expenses and easy maintenance, the wireless provider may prefer to employ a centralized BBU 2820. To support this architecture, common public radio interface (CPRI), which is a digitized optical interface and is incorporated by reference, may be used to connect the BBU 2820 and the BS 2850 as shown in FIG. 28. Transmission System 1 (T1), which is a hardware specification for communications and is incorporated by reference, or E1, which is the European counterpart to T1 and is incorporated by reference, as well as Fast Ethernet (FE), which is a group of Ethernet standards and is incorporated by reference, may be used to connect the CO 2810 and the BBU 2820 as shown in FIG. 28.

Figure 29:
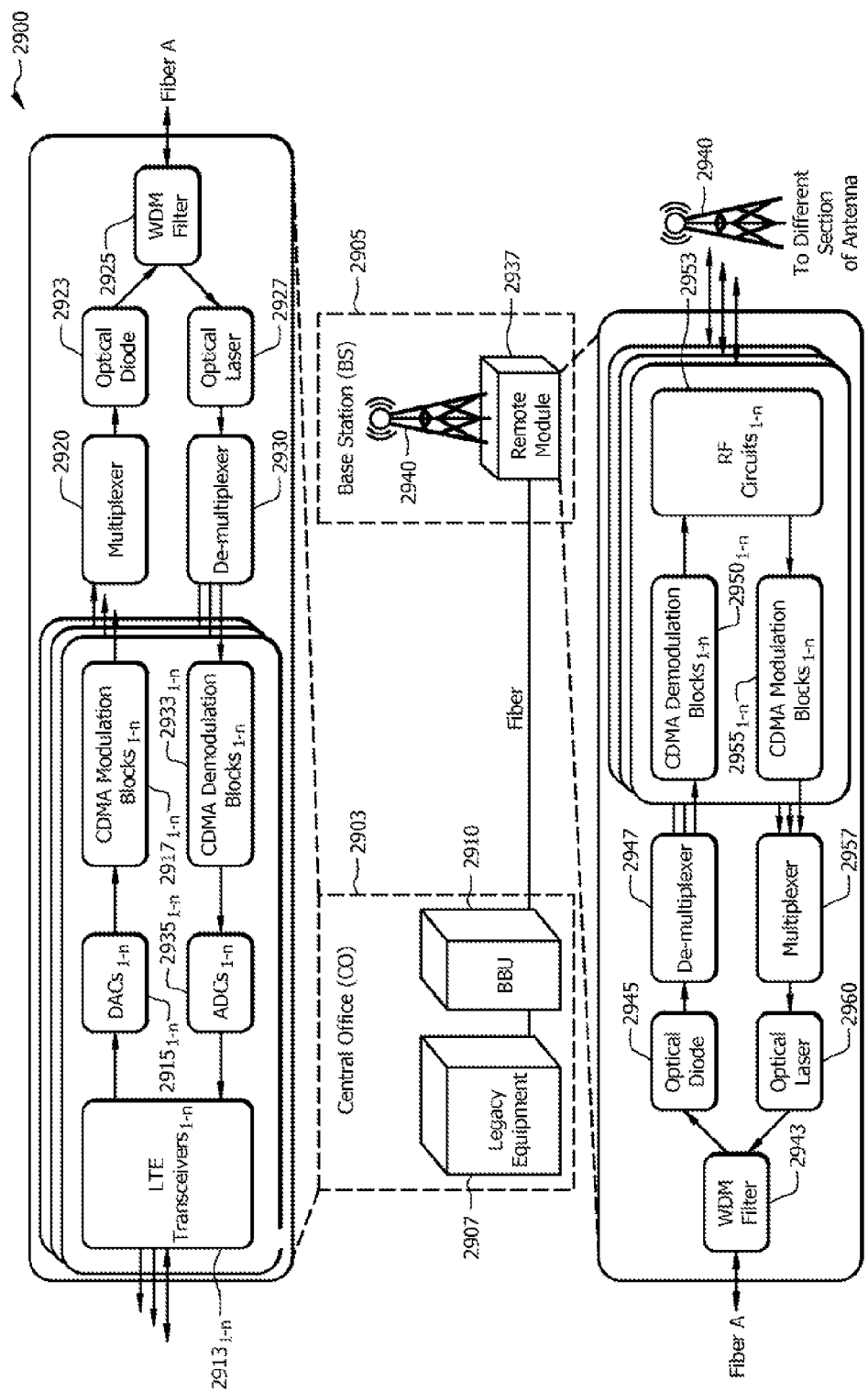
FIG. 29 is a schematic diagram of a wireless network employing fiber according to an embodiment of the disclosure.

FIG. 29 is a schematic diagram of a wireless network 2900 employing fiber according to an embodiment of the disclosure. The network 2900 may comprise a CO 2903 and a BS 2905. The CO 2903 may comprise legacy equipment 2907 and a BBU 2910. The legacy equipment 2907 may be equipment typically found in an LTE CO and may function as described above or as otherwise known by one of ordinary skill in the art. The BBU 2910 may comprise LTE transceivers$_{1-n}$ $2913_{1-n}$, DAC $s_{1-n}$ $2915_{1-n}$, CDMA modulation blocks$_{1-n}$ $2917_{1-n}$, a multiplexer 2920, an optical diode 2923, a WDM filter 2925, an optical laser 2927, a de-multiplexer 2930, CDMA demodulation blocks$_{1-n}$ $2933_{1-n}$, and $ADCs_{1-n}$ $2935_{1-n}$, which may function as described above or as otherwise known by one of ordinary skill in the art. The BS 2905 may comprise a remote module 2937 and a tower 2940. The remote module 2937 may comprise a WDM filter 2943, an optical diode 2945, a de-multiplexer 2947, CDMA demodulation blocks$_{1-n}$ $2950_{1-n}$, RF circuits$_{1-n}$ $2953_{1-n}$, CDMA modulation blocks$_{1-n}$ $2955_{1-n}$, a multiplexer 2957, and an optical laser 2960, which may function as described above or as otherwise known by one of ordinary skill in the art. The tower 2940 may function as described above or as otherwise known by one of ordinary skill in the art.

As shown in FIG. 29, the BBU 2910 may be moved from a remote location to the CO 2903, and a fiber may connect the BBU 2910 to the remote module 2937. The BBU 2910 and the remote module 2937 may communicate via an intermediate frequency (IF) signal or a baseband signal. If communicating via an IF signal, then the remote module 2937 may be simpler and provide for less power consumption, less volume, less weight, and easier installation. If communicating via a baseband signal, then a single fiber may communicate with more base stations at the same time.

Figure 30:
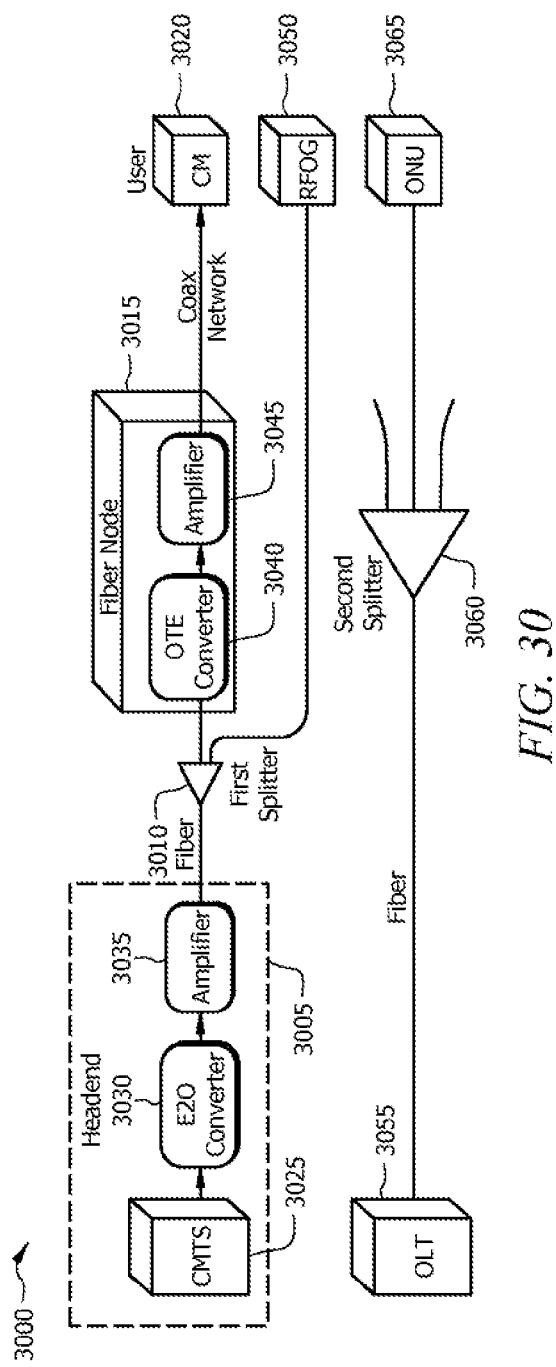
FIG. 30 is a schematic diagram of a hybrid fiber-coaxial (HFC) network.

FIG. 30 is a schematic diagram of an HFC network 3000. The network 3000 may comprise a headend 3005, a first splitter 3010, a fiber node 3015, a cable modem (CM) 3020, a radio frequency over glass (RFOG) 3050, an OLT 3055, a second splitter 3060, and an ONU 3065, which may function as described above or as otherwise known by one of ordinary skill in the art. The headend 3005 may comprise a cable modem termination system (CMTS) 3025, an ETO converter 3030, and an amplifier 3035, which may function as described above or as otherwise known by one of ordinary skill in the art. The fiber node 3015 may comprise an OTE converter 3040 and an amplifier, which may function as described above or as otherwise known by one of ordinary skill in the art.

A multiple-system operator (MSO) may typically run an HFC network such as the network 3000. The network 3000 may provide television (TV), voice, and Internet services to users. The CMTS 3025 may provide Internet service. A transceiver (not shown) associated with the CMTS 3025 may use DOCSIS to generate a QAM-modulated signal. The ETO converter 3030 may convert the signal into an optical signal, the amplifier 3035 may amplify the optical signal, and the headend 3005 may transmit the optical signal to the fiber and towards the fiber node 3015. At the fiber node 3015, the OTE converter 3040 may convert the optical signal into an electrical signal, the amplifier 3045 may amplify the electrical signal, and the fiber node 3015 may transmit the electrical signal to the coaxial cable and towards the CM 3020. The CM may demodulate the electrical signal to obtain the original data.

To compete with traditional fiber-to-the-home (FTTH) technologies, the Society of Cable Telecommunications Engineers (SCTE) developed RFOG, which may also extend fiber to the home, but it may do so using an HFC infrastructure. Because of RFOG's limitations, many MSOs do not use it. As an alternative, CableLabs developed DOCSIS Provisioning on EPON (DPoE), which in incorporated by reference. MSOs may be more likely to use DPoE to provide high-speed Internet services. If the MSOs use both traditional CMTS and DPoE, then they will need to manage two systems, which may increase the management workload and thus operating expenses. On the other hand, DPoE may not be able to use the HFC infrastructure.

Figure 31:
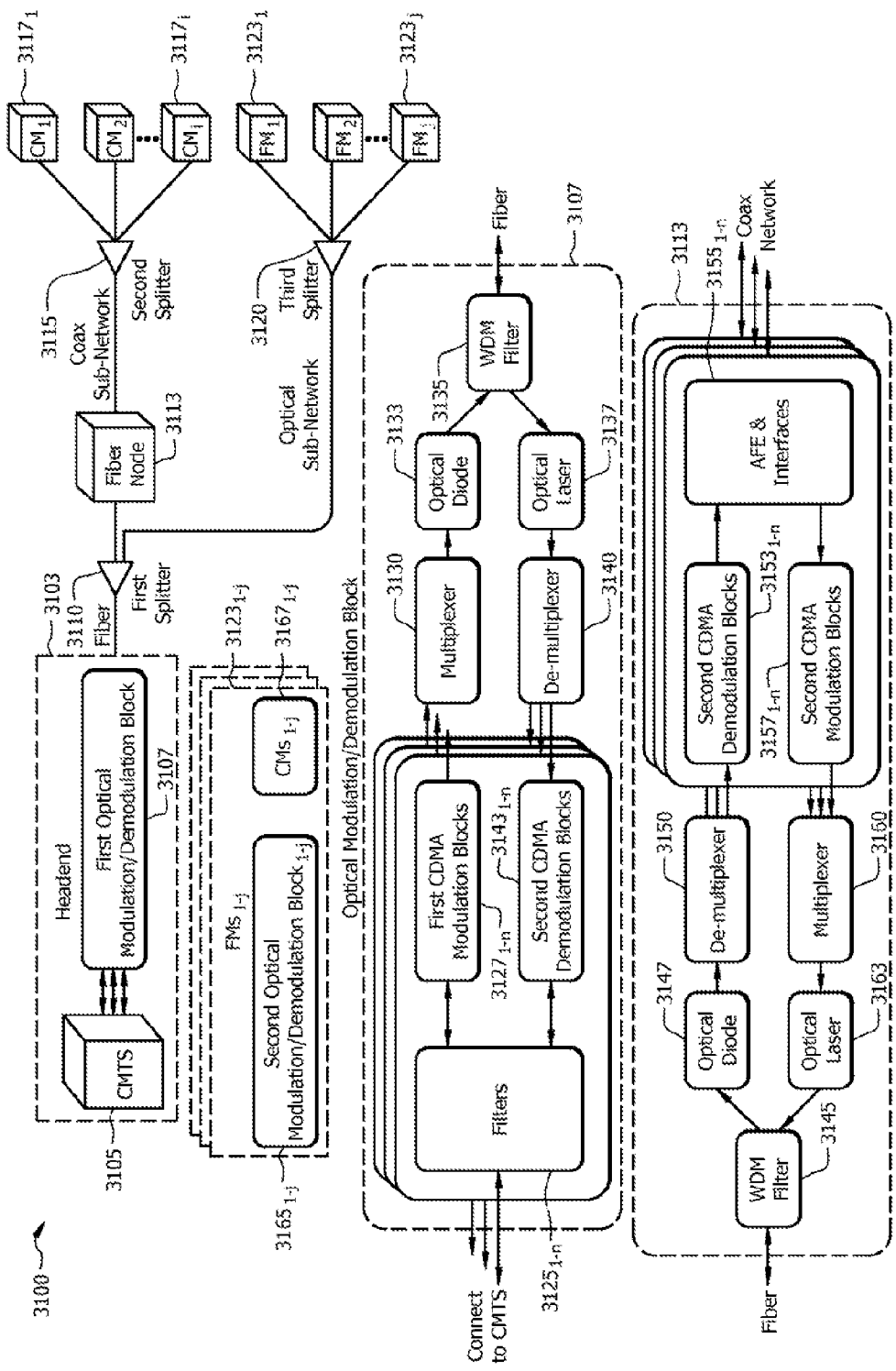
FIG. 31 is a schematic diagram of an HFC network employing coaxial and optical sub-networks according to an embodiment of the disclosure.

FIG. 31 is a schematic diagram of an HFC network 3100 employing coaxial and optical sub-networks according to an embodiment of the disclosure. The network 3100 may comprise a headend 3103 comprising a CMTS 3105 and a first optical modulation/demodulation block 3107, a first splitter 3110, a fiber node 3113, a second splitter 3115, $CMs_{1-i}$ 3117$_{1-i}$, a third splitter 3120, and fiber modems$_{1-j}$ (FMs) 3123$_{1-j}$, which may function as described above or as otherwise known by one of ordinary skill in the art. I and j may be any positive integers. The system 3100 may provide a cost-efficient method for expanding the capacity of currently-deployed fiber and do so using existing HFC infrastructure.

The first optical modulation/demodulation block 3107 may be added to modulate signals transmitted from the CMTS 3105 to the fiber and to demodulate signals transmitted from the fiber to the CMTS 3105. The first optical modulation/demodulation block 3107 may comprise filters$_{1-n}$ 3125$_{1-n}$, first CDMA modulation blocks$_{1-n}$ 3127$_{1-n}$, a multiplexer 3130, an optical diode 3133, a WDM filter 3135, an optical laser 3137, a de-multiplexer 3140, and first CDMA demodulation blocks$_{1-n}$ 3143$_{1-n}$, which may function as described above or as otherwise known by one of ordinary skill in the art. N may be equal to i plus j.

The fiber node 3113 may comprise a WDM filter 3145, an optical diode 3147, a demultiplexer 3150, second CDMA demodulation blocks$_{1-n}$ 3153$_{1-n}$, AFEs and interfaces$_{1-n}$ 3155$_{1-n}$, second CDMA modulation blocks$_{1-n}$ 3157$_{1-n}$, a multiplexer 3160, and an optical laser 3163, which may function as described above or as otherwise known by one of ordinary skill in the art. The second CDMA demodulation blocks$_{1-n}$ 3153$_{1-n}$, second CDMA modulation blocks$_{1-n}$ 3157$_{1-n}$, and associated systems may be added to modulate signals transmitted from the $CMs_{1-i}$ 3117$_{1-i}$ to the fiber and to demodulate signals transmitted from the fiber to the $CMs_{1-i}$ 3117$_{1-i}$.

The $FMs_{1-j}$ 3123$_{1-j}$ may allow for the network 3100 to more easily evolve into an FTTH network. The $FMs_{1-j}$ 3123$_{1-j}$ may be in users' homes. The $FMs_{1-j}$ 3123$_{1-j}$ may comprise second modulation/demodulation blocks$_{1-j}$ 3165$_{1-j}$ and $CMs_{1-j}$ 3167$_{1-j}$, which may function as described above or as otherwise known by one of ordinary skill in the art. The first splitter 3110 and the third splitter 3120 may allow the network 3100 to feed optical signals to the $FMs_{1-j}$ 3123$_{1-j}$.

The network 3100 may employ DOCSIS 2.0, DOCSIS, 3.0, DOCSIS 3.1, or later, all of which are incorporated by reference. The presence of the first optical modulation/demodulation block 3107 in the headend 3103 and the second modulation/demodulation blocks$_{1-j}$ 3165$_{1-j}$ in the $FMs_{1-j}$ 3123$_{1-j}$ may improve the capacity of the network 3100. A typical HFC network may provide a bandwidth of 1 GHz over the single fiber. If, however, the network 3100 provides an optical bandwidth of 10 GHz and an orthogonal code of length eight, then the network 3100 may provide eight times the capacity of the typical HFC network. The port/channel and orthogonal code mapping relationships between the first optical modulation/demodulation block 3107 in the headend 3103 and the second modulation/demodulation blocks$_{1-j}$ 3165$_{1-j}$ in the $FMs_{1-j}$ 3123$_{1-j}$ may be maintained as described for FIG. 26.

Figure 32:
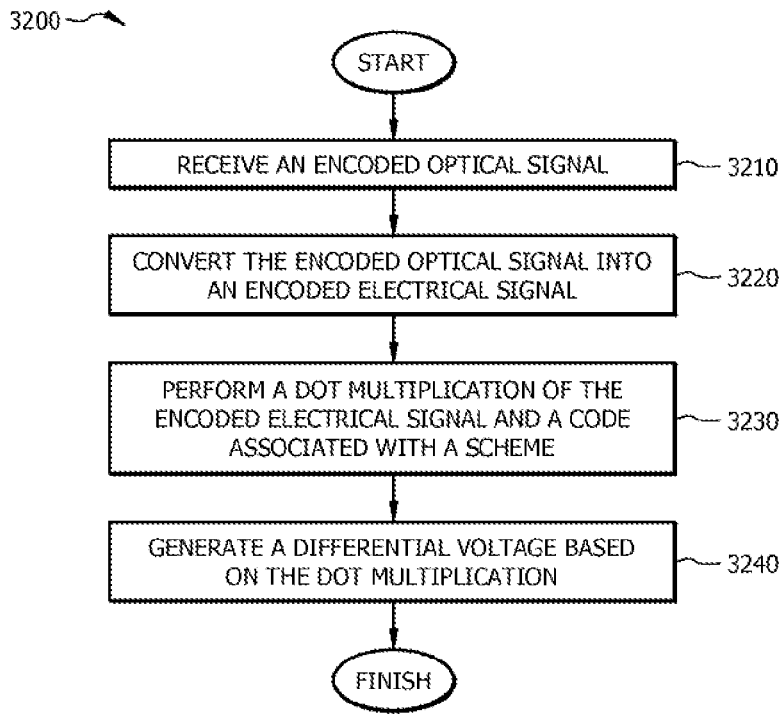
FIG. 32 is a flowchart illustrating a method of CDMA demodulation according to an embodiment of the disclosure.

FIG. 32 is a flowchart illustrating a method 3200 of CDMA demodulation according to an embodiment of the disclosure. The method 3200 may be implemented in the receiver 600. At step 3210, an encoded optical signal may be received. At step 3220, the encoded optical signal may be converted into an encoded electrical signal. The encoded electrical signal may be encoded using a CDMA scheme. At step 3230, a dot multiplication of the encoded electrical signal and a code associated with a scheme may be performed. At step 3240, a differential voltage based on the dot multiplication may be generated.

Figure 33:
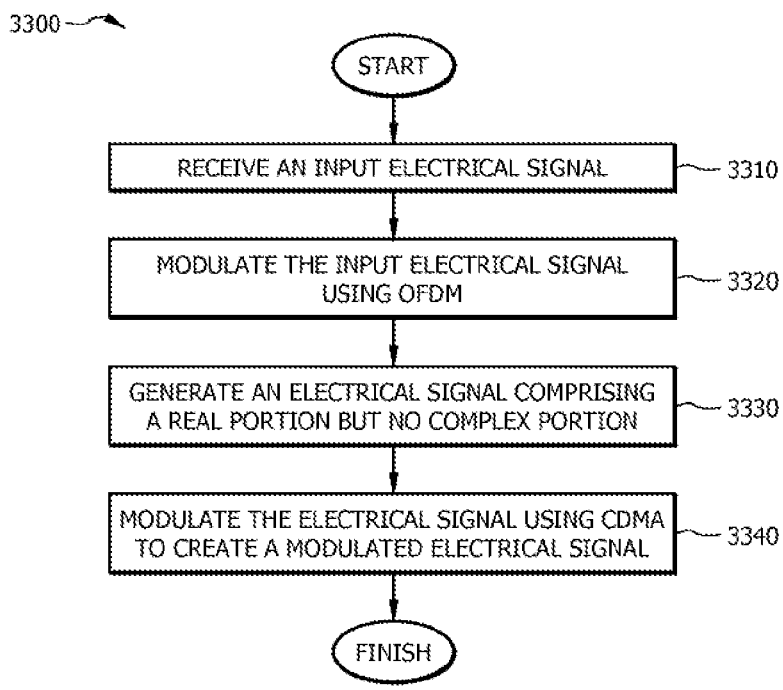
FIG. 33 is a flowchart illustrating a method of transmitting an OFDM-modulated and a CDMA-modulated signal according to an embodiment of the disclosure.

FIG. 33 is a flowchart illustrating a method 3300 of transmitting an $OFDM_{13875447}$ modulated and a CDMA-modulated signal according to an embodiment of the disclosure. The method 3300 may be implemented in the transmitter 1610. At step 3310, an input electrical signal may be received. At step 3320, the input electrical signal may be modulated using OFDM. At step 3330, an electrical signal comprising a real portion but no complex portion may be generated. At step 3340, the electrical signal may be modulated using CDMA to create a modulated electrical signal.

Figure 34:
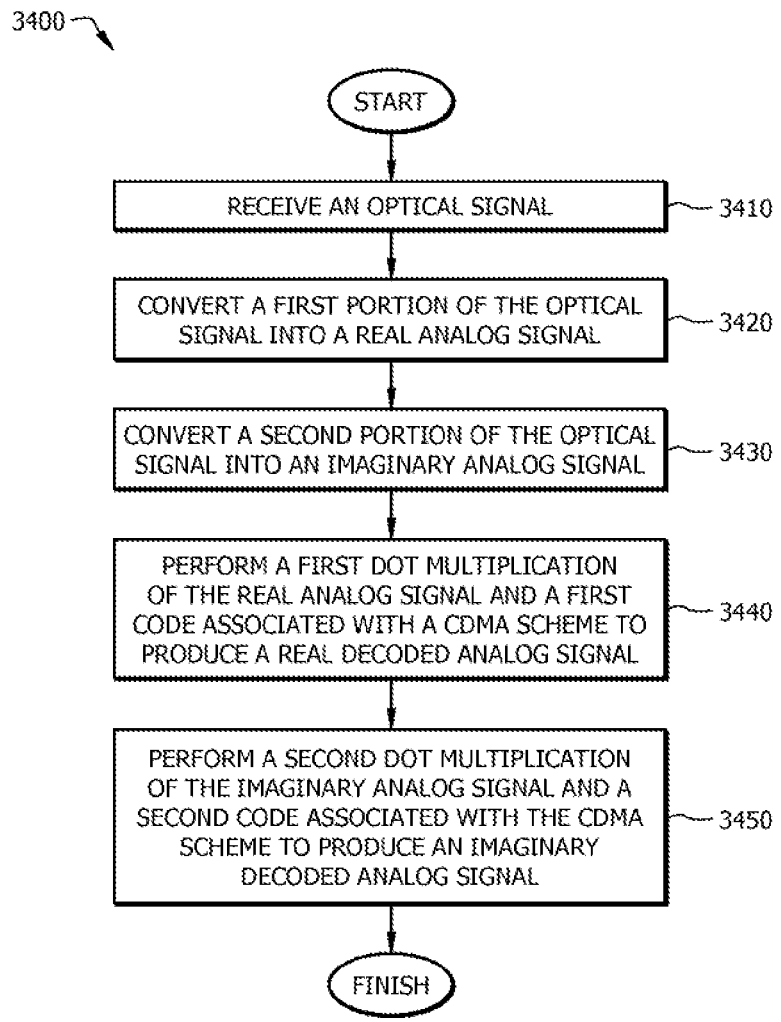
FIG. 34 is a flowchart illustrating a method of receiving a CDMA-modulated and an OFDM-modulated signal according to an embodiment of the disclosure.

FIG. 34 is a flowchart illustrating a method 3400 of receiving a CDMA-modulated and an OFDM-modulated signal according to an embodiment of the disclosure. The method 3400 may be implemented in the receiver 1620. At step 3410, an optical signal may be received. At step 3420, a first portion of the optical signal may be converted into a real analog signal. At step 3430, a second portion of the optical signal may be converted into an imaginary analog signal. At step 3440, a first dot multiplication of the real analog signal and a first code associated with a CDMA scheme may be performed to produce a real decoded analog signal. At step 3450, a second dot multiplication of the imaginary analog signal and a second code associated with the CDMA scheme may be performed to produce an imaginary decoded analog signal.

Figure 35:
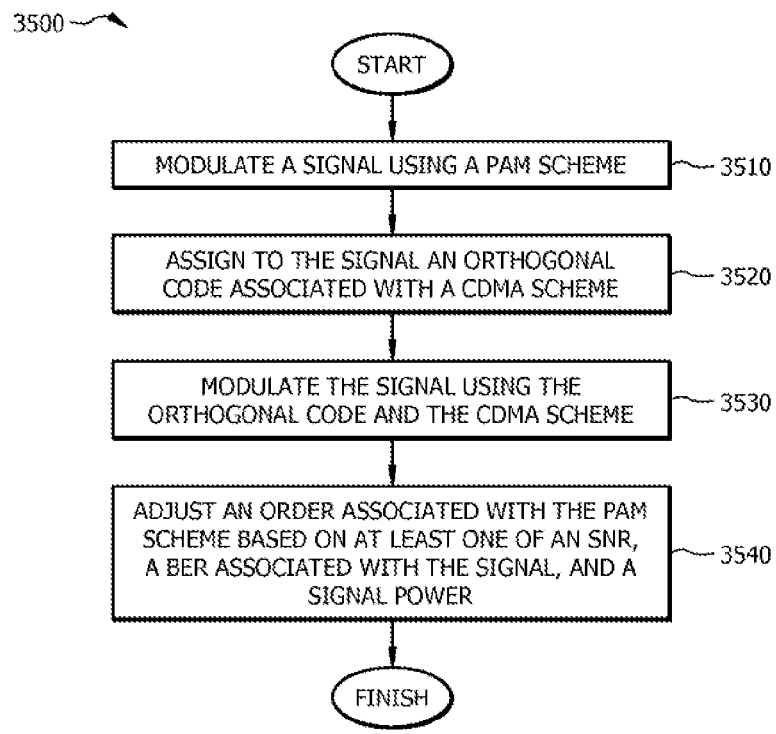
FIG. 35 is a flowchart illustrating a method of dynamically adjusting a PAM scheme according to an embodiment of the disclosure.

FIG. 35 is a flowchart illustrating a method 3500 of dynamically adjusting a PAM scheme according to an embodiment of the disclosure. The method 3500 may be implemented in the transmitter 2100 or the receiver 2200. At step 3510, a signal may be modulated using a PAM scheme. At step 3520, the signal may be assigned an orthogonal code associated with a CDMA scheme. At step 3530, the signal may be modulated using the orthogonal code and the CDMA scheme. At step 3540, an order associated with the PAM scheme may be adjusted based on at least one of an SNR, a BER associated with the signal, and a signal power.

Figure 36:
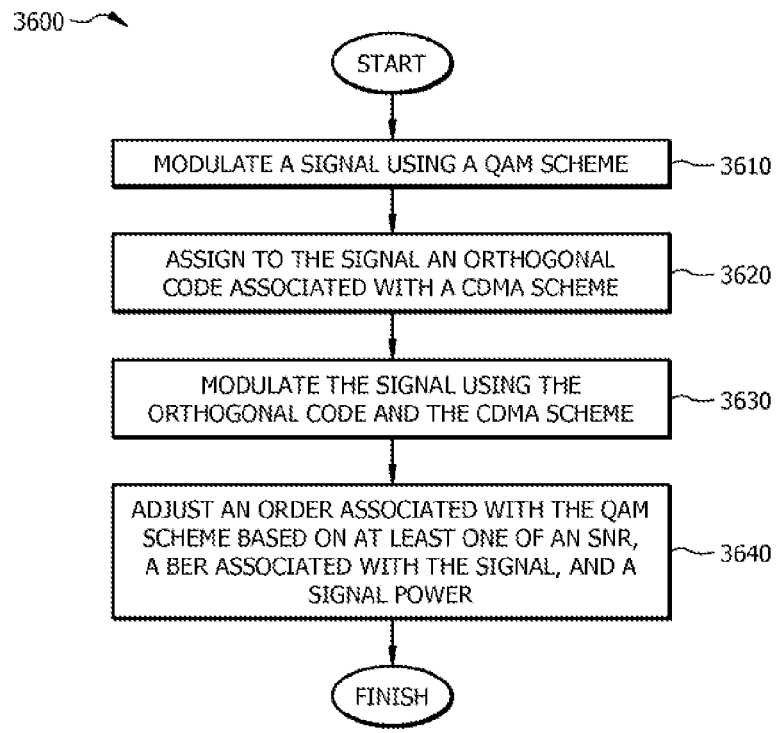
FIG. 36 is a flowchart illustrating a method of dynamically adjusting a QAM scheme according to an embodiment of the disclosure.

FIG. 36 is a flowchart illustrating a method 3600 of dynamically adjusting a QAM scheme according to an embodiment of the disclosure. The method 3600 may be implemented in the transceiver 2400. At step 3610, a signal may be modulated using a QAM scheme. At step 3620, the signal may be assigned an orthogonal code associated with a CDMA scheme. At step 3630, the signal may be modulated using the orthogonal code and the CDMA scheme. At step 3640, an order associated with the QAM scheme may be adjusted based on at least one of an SNR, a BER associated with the signal, and a signal power.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical receiver comprising:
   an optical port configured to receive an encoded optical signal that is orthogonal frequency-division multiplexing (OFDM) and code division multiple access (CDMA) encoded; and
   one or more code division multiple access (CDMA) demodulation blocks coupled to the optical port and configured to:
   receive an encoded electrical signal that is based upon the encoded optical signal,
   demodulate the encoded electrical signal using a code associated with a CDMA scheme used at a transmitter end to produce a CDMA demodulated signal; and
   an OFDM demodulation block coupled to the one or more CDMA demodulation blocks and configured to perform OFDM demodulation on the CDMA demodulated signal.

2. The optical receiver of claim 1, further comprising:
   one or more analog-to-digital converters (ADCs) coupled between the one or more CDMA demodulation blocks and the OFDM demodulation block, and configured to perform analog-to-digital conversion after the CDMA modulation blocks.

3. The optical receiver of claim 2, wherein the one or more CDMA demodulation blocks perform a dot multiplication of the encoded electrical signal in analog domain and the code to produce the CDMA demodulated signal in analog domain.

4. The optical receiver of claim 2, wherein the one or more CDMA demodulation blocks comprise:
   a first CDMA demodulation block that performs a dot multiplication of a received real analog signal of the encoded electrical signal and the code to produce a received real decoded analog signal of the CDMA demodulated signal; and
   a second CDMA demodulation block that performs a dot multiplication of a received imaginary analog signal of the encoded electrical signal and the code to produce a received imaginary decoded analog signal of the CDMA demodulated signal.

5. The optical receiver of claim 1, wherein the OFDM modulation block comprises a fast Fourier transform or frequency domain equalizer (FFT/FEQ) block coupled to the CDMA demodulation block, a condensing block coupled to the FFT/FEQ block, and a de-mapping block coupled to the condensing block; wherein the condensing block removes a conjugate half of a parallel data block produced from the FFT/FEQ block so that the parallel data block is halved.

6. The optical receiver of claim 1, wherein the one or more CDMA modulation blocks employ a code of length 32 and a chip rate of 10 GHz.

7. The optical receiver of claim 6, wherein the OFDM modulation block employs an OFDM sampling rate of 312.5 megahertz (MHz).

8. A method for receiving optical signals at an optical receiver, comprising:
- converting an encoded optical signal into an encoded electrical signal which is orthogonal frequency-division multiplexing (OFDM) and code division multiple access (CDMA) encoded;
- demodulating the encoded electrical signal using a code associated with a CDMA scheme used at a transmitter end to produce a CDMA demodulated signal; and
- performing OFDM demodulation on the CDMA demodulated signal.

9. The method of claim 8, wherein the second encoded electrical signal is an analog signal; and before performing the OFDM demodulation, the method further comprises:
- performing analog-to-digital conversion to convert the CDMA demodulated signal from analog domain to digital domain.

10. The method of claim 9, wherein the demodulating the encoded electrical signal using a code associated with a CDMA scheme comprises:
- performing a dot multiplication of the encoded electrical signal in analog domain and the code to produce the CDMA demodulated signal in analog domain.

11. The method of claim 9, wherein the encoded electrical signal comprises a received real analog signal and a received imaginary analog signal; and the demodulating the encoded electrical signal using a code comprises:
- performing a dot multiplication of the received real analog signal and the code to produce a received real decoded analog signal of the CDMA demodulated signal; and
- performing a dot multiplication of the received imaginary analog signal and the code to produce a received imaginary decoded analog signal of the CDMA demodulated signal.

12. An optical communication system comprising:
- an optical transmitter that transmits an encoded optical signal which is orthogonal frequency-division multiplexing (OFDM) and code division multiple access (CDMA) encoded;
- an optical receiver that receives the encoded optical signal via an optical port;
- wherein the optical receiver comprises:
- one or more code division multiple access (CDMA) demodulation blocks coupled to the optical port and configured to:
  - receive an encoded electrical signal that is based upon the encoded optical signal,
  - demodulate the encoded electrical signal using a code associated with a CDMA scheme used at a transmitter end to produce a CDMA demodulated signal; and
- an OFDM demodulation block coupled to the one or more CDMA demodulation blocks and configured to perform OFDM demodulation on the CDMA demodulated signal.

13. The optical communication system of claim 12, further comprising:
- one or more analog-to-digital converters (ADCs) coupled between the CDMA demodulation blocks and the OFDM demodulation block, and configured to perform analog-to-digital conversion after the CDMA modulation blocks.

14. The optical communication system of claim 13, wherein the one or more CDMA demodulation blocks perform a dot multiplication of the encoded electrical signal in analog domain and the code to produce the CDMA demodulated signal in analog domain.

15. The optical communication system of claim 13, wherein the one or more CDMA demodulation blocks comprise:
- a first CDMA demodulation block that performs a dot multiplication of a received real analog signal of the encoded electrical signal and the code to produce a received real decoded analog signal of the CDMA demodulated signal; and
- a second CDMA demodulation block that performs a dot multiplication of a received imaginary analog signal of the encoded electrical signal and the code to produce a received imaginary decoded analog signal of the CDMA demodulated signal.

16. The optical communication system of claim 12, wherein the OFDM modulation block comprises a fast Fourier transform or frequency domain equalizer (FFT/FEQ) block coupled to the CDMA demodulation block, a condensing block coupled to the FFT/FEQ block, and a de-mapping block coupled to the condensing block; wherein the condensing block removes a conjugate half of a parallel data block produced from the FFT/FEQ block so that the parallel data block is halved.

17. The optical communication system of claim 12, wherein the one or more CDMA modulation blocks employ a code of length 32 and a chip rate of 10 GHz.

18. The optical communication system of claim 17, wherein the OFDM modulation block employs an OFDM sampling rate of 312.5 megahertz (MHz).

* * * * *